(12) United States Patent
Cleary et al.

(10) Patent No.: US 11,959,522 B2
(45) Date of Patent: Apr. 16, 2024

(54) BRAKE ASSEMBLY

(71) Applicant: Meritor Heavy Vehicle Braking Systems (UK) Limited, Gwent (GB)

(72) Inventors: Sean Cleary, Gwent (GB); Alex Szafnauer, Gwent (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 0 days.

(21) Appl. No.: 18/342,346

(22) Filed: Jun. 27, 2023

(65) Prior Publication Data

US 2023/0341014 A1  Oct. 26, 2023

Related U.S. Application Data

(62) Division of application No. 17/375,326, filed on Jul. 14, 2021, now Pat. No. 11,725,703.

(30) Foreign Application Priority Data

Aug. 11, 2020 (EP) ..................................... 20190540

(51) Int. Cl.
  *F16D 65/097* (2006.01)
  *F16D 55/225* (2006.01)
  *F16D 65/00* (2006.01)
  *F16D 55/00* (2006.01)
  *F16D 127/02* (2012.01)

(52) U.S. Cl.
  CPC ......... *F16D 55/225* (2013.01); *F16D 65/005* (2013.01); *F16D 65/097* (2013.01); *F16D 2055/0004* (2013.01); *F16D 2055/0075* (2013.01); *F16D 2127/02* (2013.01)

(58) Field of Classification Search
  CPC .. F16D 55/225; F16D 65/0065; F16D 65/097; F16D 2055/0004; F16D 2055/0075; F16D 2127/02
  See application file for complete search history.

(56) References Cited

U.S. PATENT DOCUMENTS

| | | | |
|---|---|---|---|
| 4,491,204 A | 1/1985 | Dirauf et al. | |
| 5,511,638 A | 4/1996 | Tsuruta | |
| 5,549,181 A | 8/1996 | Evans | |
| 8,393,441 B2 | 3/2013 | Gutelius | |

(Continued)

FOREIGN PATENT DOCUMENTS

| | | | |
|---|---|---|---|
| DE | 3108113 A1 | 9/1982 | |
| DE | 102017009295 A1 | 4/2019 | |

(Continued)

OTHER PUBLICATIONS

Extended European Search Report dated Nov. 23, 2020 for related European Application No. 20190540.3; 8 Pages.

(Continued)

*Primary Examiner* — Thomas W Irvin
(74) *Attorney, Agent, or Firm* — Brooks Kushman PC

(57) ABSTRACT

A brake assembly having a brake carrier, a caliper, first and second brake pads, a pad retraction spring, and a first stop surface. The pad retraction spring urges the first and second brake pads in a direction away from a rotor plane. A first supporting portion of the pad retraction spring is configured to abut the first stop surface to inhibit the pad retraction spring from entering a partially enclosed volume.

8 Claims, 13 Drawing Sheets

(56) References Cited

U.S. PATENT DOCUMENTS

| | | |
|---|---|---|
| 8,857,575 B2 | 10/2014 | Philpott |
| 10,309,470 B1 | 6/2019 | Philpott |
| 10,563,713 B2 | 2/2020 | Fricke et al. |
| 10,670,091 B2 | 6/2020 | Fricke et al. |
| 10,801,565 B2 | 10/2020 | Krause et al. |
| 10,962,068 B2 | 3/2021 | Brandl et al. |
| 11,125,286 B2 | 9/2021 | Fricke et al. |
| 11,466,739 B2 | 10/2022 | Zenzen et al. |
| 11,649,864 B2 | 5/2023 | Philpott et al. |
| 11,802,601 B2 * | 10/2023 | D'Alessio ............ F16D 55/228 |
| 2018/0106308 A1 | 4/2018 | Fricke et al. |
| 2018/0106309 A1 | 4/2018 | Fricke et al. |
| 2018/0106313 A1 | 4/2018 | Fricke et al. |
| 2018/0223921 A1 | 8/2018 | Krause et al. |
| 2019/0293133 A1 | 9/2019 | Brandl et al. |
| 2020/0141455 A1 | 5/2020 | Fricke et al. |
| 2020/0182316 A1 | 6/2020 | Zenzen et al. |
| 2020/0355232 A1 | 11/2020 | Adkins et al. |
| 2021/0246952 A1 | 8/2021 | Adkins et al. |
| 2021/0270335 A1 | 9/2021 | D'Alessio et al. |
| 2022/0397172 A1 * | 12/2022 | Philpott ................ B60T 1/065 |
| 2022/0412414 A1 * | 12/2022 | Meissner ............ F16D 65/0978 |
| 2023/0109487 A1 * | 4/2023 | Crippa ................ F16D 65/0068 188/73.38 |

FOREIGN PATENT DOCUMENTS

| | | |
|---|---|---|
| DE | 10 2018 114396 A1 | 12/2019 |
| DE | 10 2018 120512 A1 | 2/2020 |
| EP | 1241369 A2 | 9/2002 |
| EP | 2557330 A1 | 2/2013 |
| GB | 2257483 A | 1/1993 |
| JP | H0292130 U | 7/1990 |
| JP | 2003148525 A | 5/2003 |
| JP | 2009127715 A | 6/2009 |
| JP | 2012 189188 A | 10/2012 |
| JP | 2012189188 A | 10/2012 |
| WO | 2014097098 A1 | 6/2014 |
| WO | 2017060515 A1 | 4/2017 |
| WO | 2018234665 A1 | 12/2018 |
| WO | 2019/068619 A1 | 4/2019 |

OTHER PUBLICATIONS

China Office Action dated Apr. 12, 2023 for related China Application No. 202110913146.5; 7 Pages.

* cited by examiner

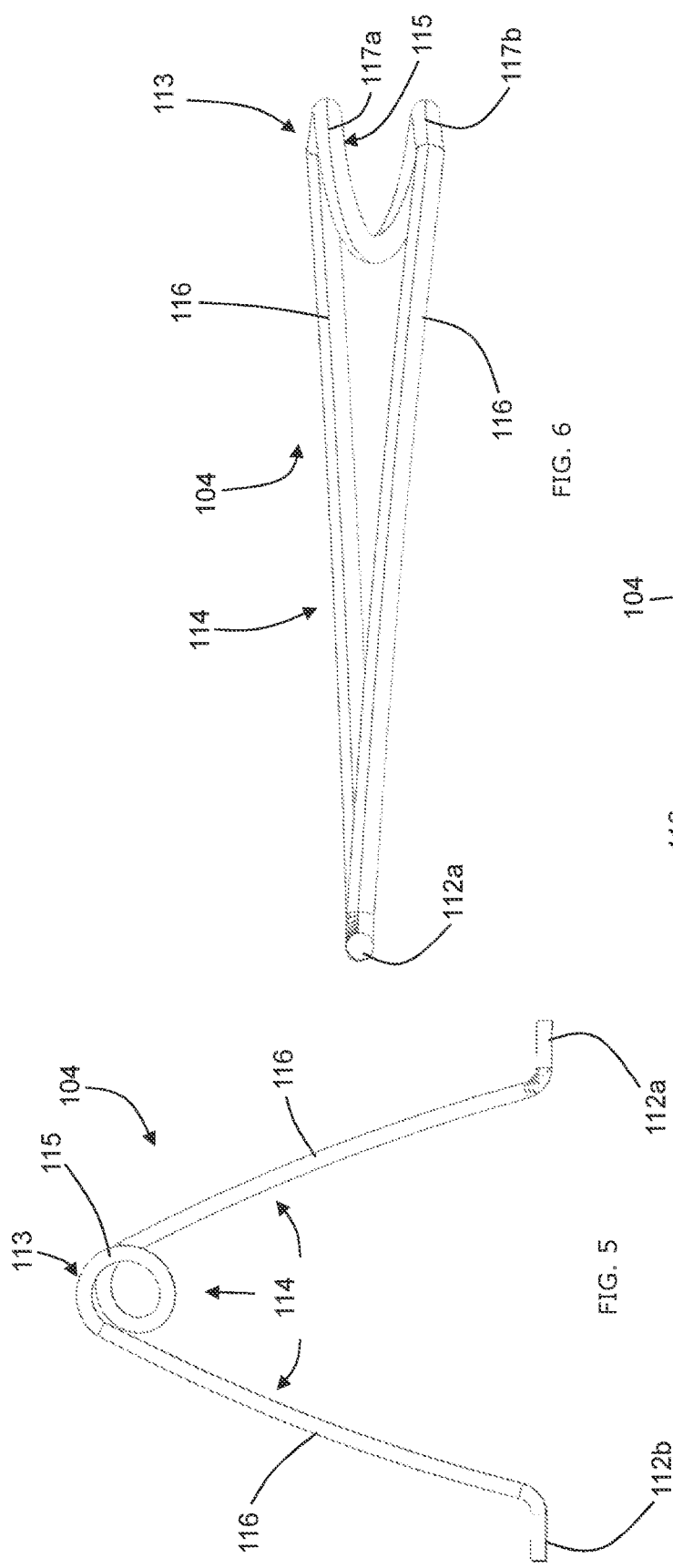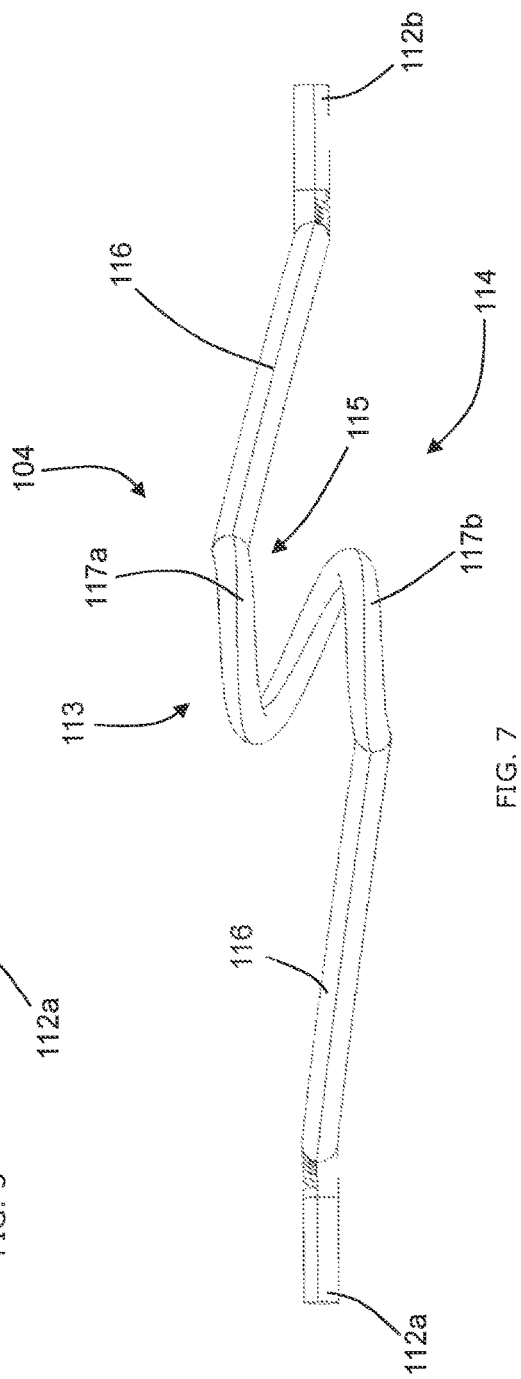

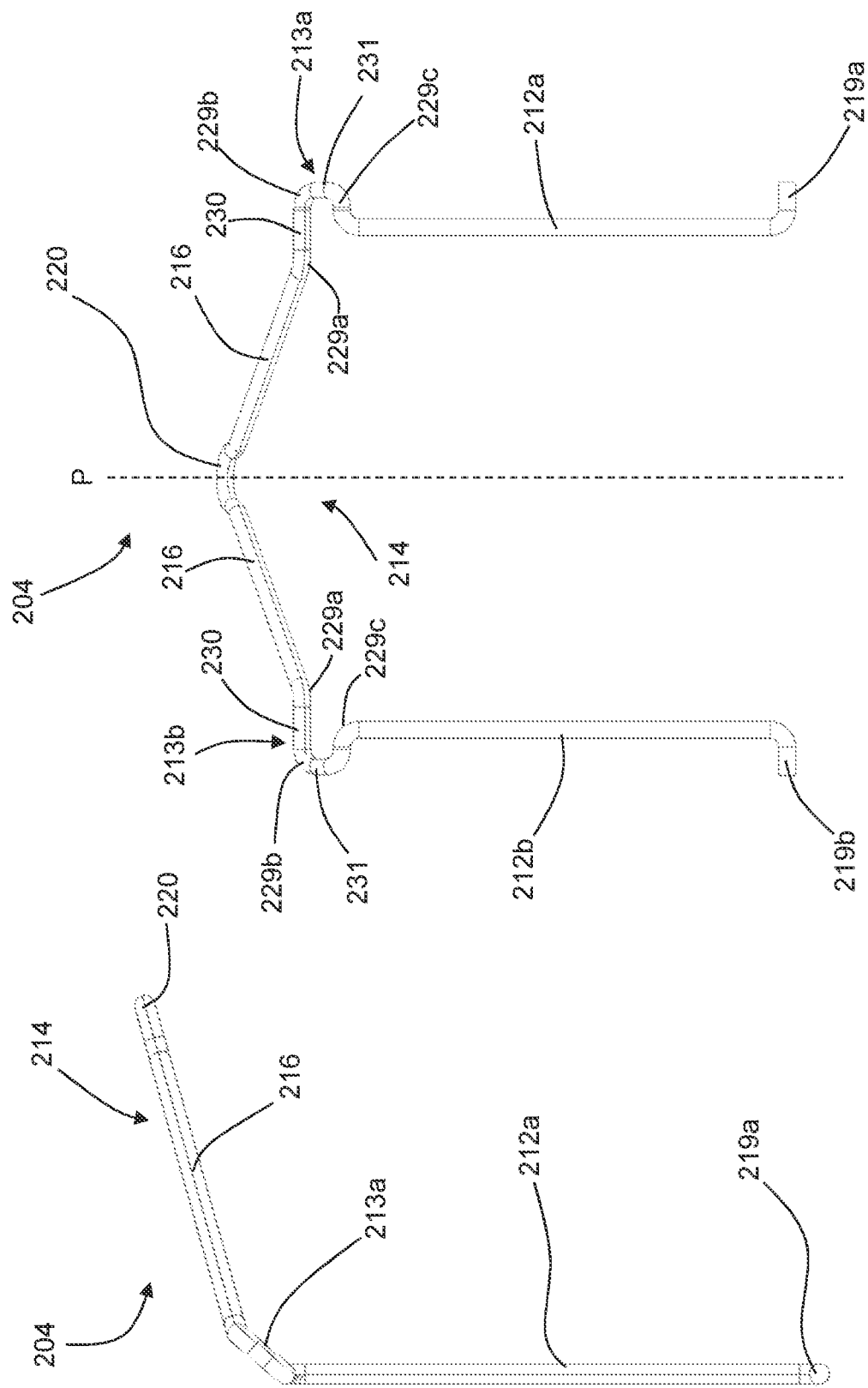

BRAKE ASSEMBLY

CROSS-REFERENCE TO RELATED APPLICATIONS

This application is a division of U.S. application Ser. No. 17/375,326, filed Jul. 14, 2021, the disclosure of which is hereby incorporated in its entirety by reference herein.

TECHNICAL FIELD

The present teachings relate to a brake assembly for a heavy duty vehicle, and in particular to a brake assembly having a pad retraction spring.

BACKGROUND

Commonly, air actuated heavy vehicles disc brakes do not have mechanisms that actively retract the brake pads once a braking operation is complete. Instead such brakes typically rely on the brake rotor to be slightly uneven or have a degree of runout and therefore to "push" the pads back to a rest position. However in many situations a residual amount of drag between the pads and the rotor may remain especially with a sliding caliper design. This may increase wear of the pad friction material and have a negative effect on the fuel economy and emissions of the vehicle upon which the disc brake is fitted.

It is known to provide a pad retraction spring to actively retract brake pads once a braking operation is complete. It is common for such pad retraction springs to engage both brake pads and to straddle the brake rotor. A problem with known pad retraction springs is their tendency to become dislodged from their intended position in use and contact the brake rotor. This has the potential to cause damage to the pad retraction spring as well as other components within the brake assembly. In addition the pad retraction spring may cease to function as desired. Solutions to this problem have been found, but they can be complex and expensive to manufacture.

The present teachings seek to overcome, or at least mitigate the problems of the prior art.

SUMMARY

According to a first aspect of the present teachings there is provided a brake assembly for a heavy duty vehicle. The brake assembly comprises a brake carrier; a caliper that is mounted to the brake carrier; a first brake pad that is received in the brake carrier, the first brake pad comprising a first backplate and a first friction material; a second brake pad that is received in the brake carrier, the second brake pad comprising a second backplate and a second friction material; a pad retraction spring having a first supporting portion, a first engaging portion and a second engaging portion; and a first stop surface. The first friction material and the second friction material face each other and define a partially enclosed volume therebetween for accommodating a brake rotor, the first stop surface located radially outward of the partially enclosed volume. A rotor plane is disposed between the first brake pad and the second brake pad. The first backplate comprises a first backplate face and the second backplate comprises a second backplate face, the first and second backplate faces facing the rotor plane. The first engaging portion of the pad retraction spring engages the first backplate face and the second engaging portion of the pad retraction spring engages the second backplate face, the pad retraction spring urging the first and second brake pads in a direction away from the rotor plane. The first supporting portion is configured to abut the first stop surface such that the pad retraction spring is inhibited from entering the partially enclosed volume.

The engagement of the first supporting portion and the first stop surface helps to reduce the risk that that the spring contacts the rotor. Further, the direct engagement of the first and second engaging portions with the first and second backplate faces applies a biasing force to help retract the brake pads and reduce rotor drag, whilst minimizing the requirement for additional components in the brake assembly to achieve this.

The first backplate face may comprise a first circumferential end region where the first friction material is recessed. The second backplate face may comprise a second circumferential end region where the second friction material is recessed. The first engaging portion may engage the first circumferential end region. The second engaging portion may engage the second circumferential end region.

This allows the pad retraction spring to urge the brake pads away from the rotor without requiring additional components or machining holes into the components of the brake assembly. Reducing the machining operations required can help to reduce overall manufacturing costs.

The first circumferential end region may extend from a first radially outer edge to a first radially inner edge of the first backplate face. The second circumferential end region may extend from a second radially outer edge to a second radially inner edge of the second backplate face. The first engaging portion may engage a majority of the first circumferential end region. The second engaging portion may engage a majority of the second circumferential end region.

MOM This provides a relatively large contact area between the pad retraction spring and the brake pads, which allows the spring force imparted by the pad retraction spring to be evenly distributed, helping to avoid uneven wear of the friction material.

The first backplate may comprise a first backplate radially inner surface. The second backplate may comprise a second backplate radially inner surface. The pad retraction spring may further comprise first and second abutment portions extending from and orientated at a non-zero angle to the first and second engaging portions respectively. The first and second abutment portions may abut the first backplate radially inner surface and the second backplate radially inner surface respectively.

The first and second abutment portions help retain the pad retraction spring in the brake assembly.

The first friction material may comprise a first friction material radially outer surface. The first stop surface may be located on the first friction material radially outer surface.

This allows the spring to be supported without requiring additional components. Further, the area over which the first engaging portion may engage the first backplate face may be maximized in this configuration.

The first backplate may comprise a first circumferential end surface and a first backplate radially outer surface. The first backplate radially outer surface may be joined to the first circumferential end surface at a corner region. The first backplate radially outer surface may comprise the first stop surface.

This allows the spring to be more compact compared to prior art designs, since the spring is supported near a circumferential edge of the brake pad.

The pad retraction spring may comprise a bridging portion interposed between the first and the second engaging portions. The rotor plane may intersect the bridging portion. The first supporting portion may be located between the bridging portion and the first engaging portion. The first stop surface may be orientated at a non-zero angle to the first backplate face. The first stop surface may be substantially perpendicular to the first backplate face. The first supporting portion may include a plurality of bends that allow the first supporting portion to abut the first stop surface and the first engaging portion to engage the first backplate face.

This allows the spring to engage the first backplate face whilst being inhibited from entering the partially enclosed volume, without requiring additional components.

The caliper may comprise an aperture. The brake assembly may comprise a pad retainer that bridges the aperture and is secured to the caliper. The pad retainer may be located radially outward of the partially enclosed volume. The pad retainer may comprise the first stop surface.

The pad retainer is located radially outward of the brake rotor, and therefore inhibits the pad retraction spring from touching the brake rotor in use.

The first stop surface may be located on a radially outer face of the pad retainer. The pad retraction spring may comprise a bridging portion interposed between the first and second engaging portions. The rotor plane may intersect the bridging portion. The bridging portion may comprise the first supporting portion. The first supporting portion may engage the first stop surface.

This provides a compact spring using a minimal amount of material.

The first supporting portion may comprise a coil formed from at least a first turn and a second turn. The first stop surface may be interposed between the first turn and the second turn.

The coil inhibits the spring from significant movement in radially inward and radially outward directions with respect to the rotor plane.

The first brake pad may further comprise a first pad spring mounted on a radially outer portion of the first backplate. The second brake pad may comprise a second pad spring mounted on a radially outer portion of the second backplate. The first engaging portion may be at least partially interposed between the first pad spring and the first friction material. The second engaging portion may be at least partially interposed between the second pad spring and the second friction material.

This inhibits the pad retraction spring from moving in a radial direction with respect to the rotor plane. Advantageously, the dimensions of the pad retraction spring in the radial direction are not significant to retention of the pad retraction spring in the brake assembly, enabling a single design of pad retraction spring to be used with brake pads having a range of dimensions in the radial direction, i.e., brake pads of a range of heights.

The pad retraction spring may comprise a second supporting portion. The second brake pad may comprise a second stop surface. The second supporting portion may be configured to abut the second stop surface such that the pad retraction spring is inhibited from entering the partially enclosed volume.

The second friction material may comprise a second friction radially outer surface and the second stop surface may be located thereon.

The second backplate may comprise a second backplate radially outer surface and the second stop surface may be located thereon.

This provides further support to the pad retraction spring, which further inhibits the pad retraction spring from contacting the brake rotor. It also provides the pad retraction spring with a supporting arrangement that may be symmetrical about the brake rotor.

The second supporting portion may be substantially a mirror image of the first supporting portion about the rotor plane.

This simplifies the manufacture of the pad retraction spring and facilitates assembly of the brake assembly.

The first backplate face may include a first recess. The second backplate face may include a second recess. The first engaging portion may be at least partially received within the first recess. The second engaging portion may be at least partially received within the second recess.

This helps to ensure that the pad retraction spring is inhibited from translating with respect to the backplates. As the recesses are in the first and second backplate faces rather than radially outer surface of the backplates, the machining operation is easier because the area to be drilled, for example, is larger and so slight misalignment would not be as significant an issue.

According to a second aspect of the present teachings, there is provided a pad retraction kit. The pad retraction kit comprises a first brake pad, a second brake pad, and a pad retraction spring for use in the brake assembly according to the first aspect of the present teachings.

According to a third aspect of the present teachings, there is provided a pad retraction spring for use in the brake assembly according to the first aspect of the present teachings.

BRIEF DESCRIPTION OF THE DRAWINGS

Embodiments are now disclosed by way of example only with reference to the drawings, in which:

FIG. 5 is an upper view of a pad retraction spring of the brake assembly of FIG. 1;

FIG. 6 is a side view of the pad retraction spring of FIG. 5;

FIG. 7 is a front view of the pad retraction spring of FIG. 5;

FIG. 12 is a side view of a pad retraction spring of the brake assembly of FIG. 8;

FIG. 13 is a rear view of the pad retraction spring of FIG. 12;

DETAILED DESCRIPTION

Figure 1:
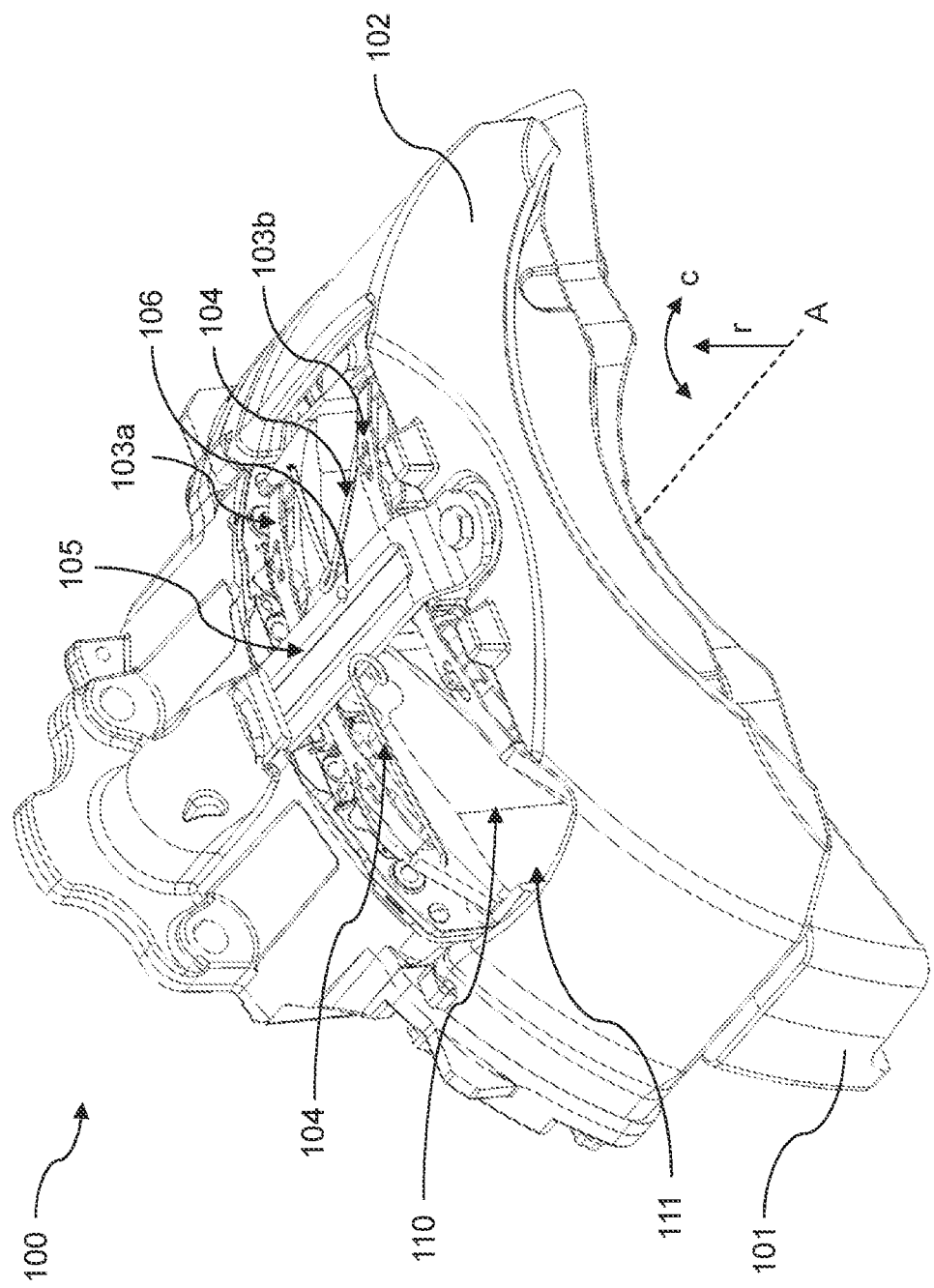
FIG. 1 is an isometric view of a brake assembly according to a first embodiment of the present teachings.
Figure 2:
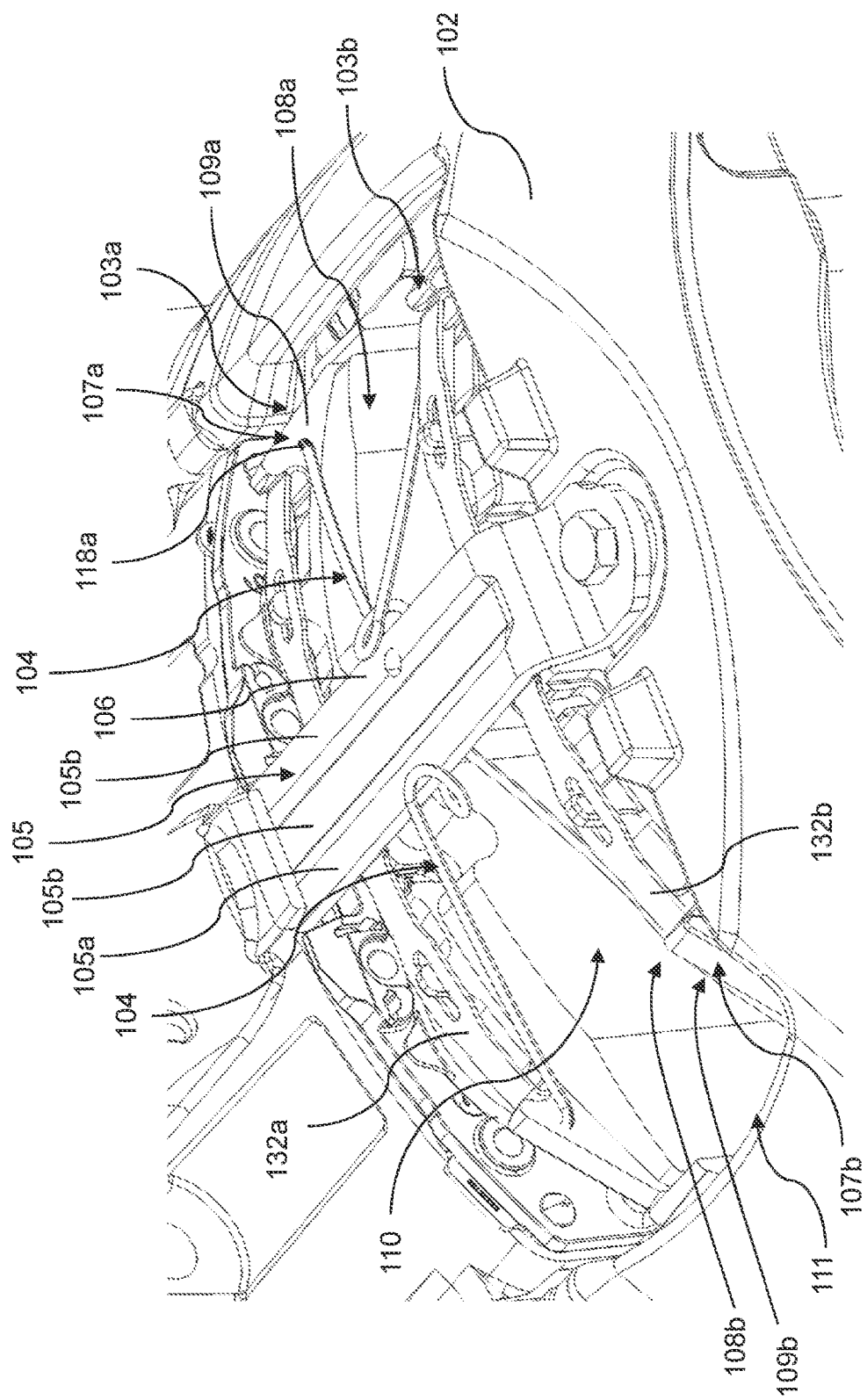
FIG. 2 is a magnified view of FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIGS. 1 to 7 show a brake assembly 100 for a heavy duty vehicle and components thereof according to a first embodiment of the present teachings.

With reference to FIGS. 1 to 4, the brake assembly 100 includes a brake carrier 101 and a caliper 102 mounted to the brake carrier 101. The caliper 102 is slidably mounted to the brake carrier 101 via two pins (not shown) such that the caliper 102 is able to translate relative to the brake carrier 101 in a direction parallel to a rotor axis A, which is illustrated as a dashed line in FIG. 1. The rotor axis A defines an axis of rotation of a brake rotor 140 (see FIG. 3), as will be discussed more below.

A first brake pad 103a and a second brake pad 103b are received and supported in the brake carrier 101. The brake carrier 101 may be fixedly mounted to a vehicle (not shown). For example, the brake carrier 101 may be directly or indirectly mounted to an axle assembly (not shown) or a steering knuckle (not shown). The brake carrier 101 includes a rotor opening (not shown) that may receive the brake rotor 140. As such, the brake carrier 101 may straddle the brake rotor and help support the brake pads 103a, 103b on opposite sides of the brake rotor 140 in circumferential and radially inward directions.

The first brake pad 103a includes a first backplate 107a. Mounted on the first backplate 107a is a first layer of friction material 108a. Likewise, the second brake pad 103b includes a second backplate 107b. Mounted on the second backplate 107b is a second layer of friction material 108b.

Figure 3:
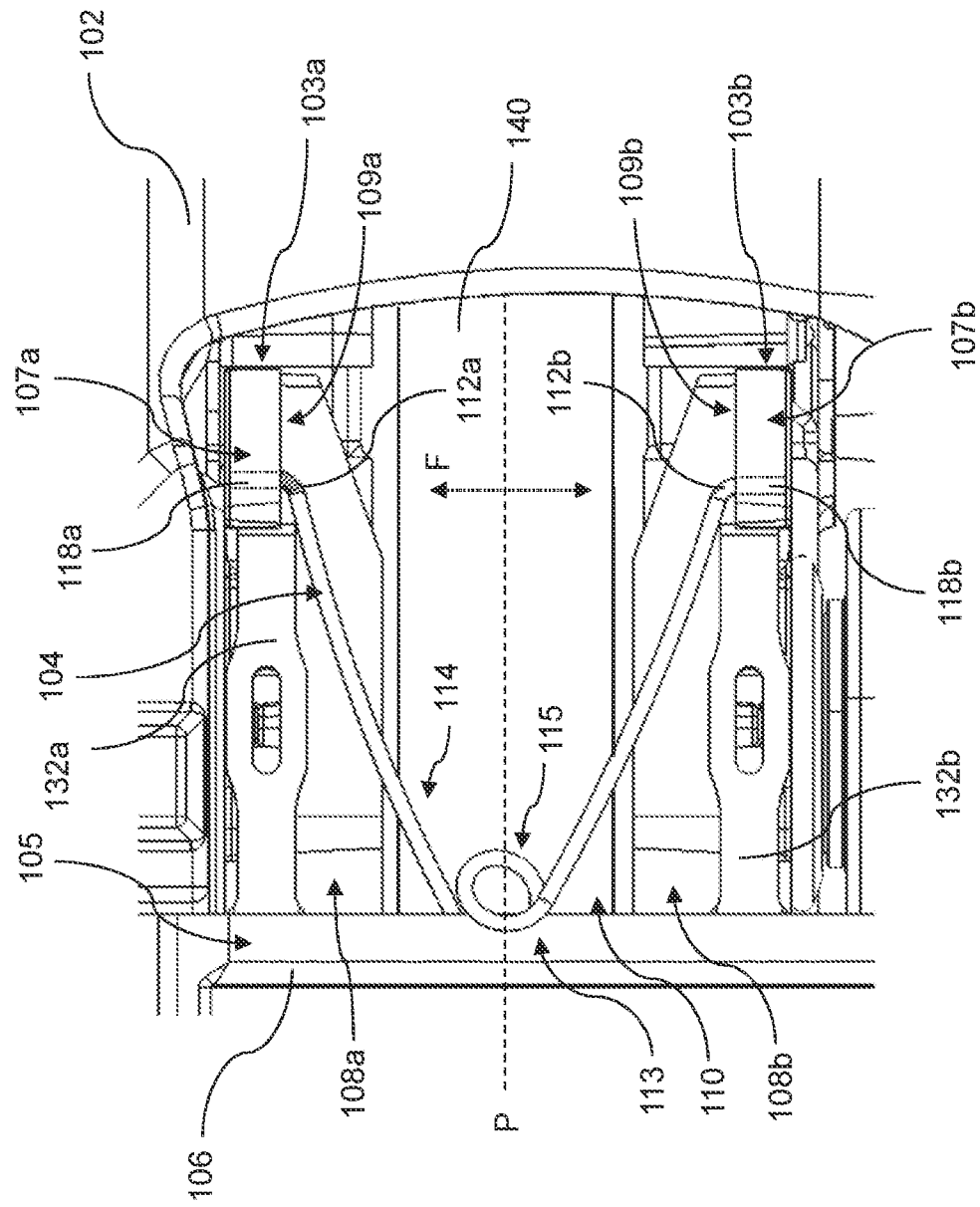
FIG. 3 is a magnified upper view of FIG. 1.

A rotor plane P (see FIG. 3) is disposed between the first brake pad 103a and the second brake pad 103b. The rotor axis A is normal to the rotor plane P, which is located equidistant from the brake pads 103a, 103b. As such, the first 108a and the second 108b friction materials face the rotor plane P. As can be seen in FIG. 3, the rotor plane P intersects the brake rotor 140.

The caliper 102 includes an actuator in the form of a piston (not shown), that actuates the brake pads 103a, 103b into engagement with the brake rotor 140, i.e., towards the rotor plane P. The actuator actuates the first brake pad 103a into frictional contact with the brake rotor 140 and a reaction force moves the caliper 102 with respect to the brake carrier 101 to actuate the second brake pad 103b into frictional contact with an opposite side of the brake rotor 140 to help slow rotation of the brake rotor 140 and an associated vehicle wheel.

The first friction material 108a and the second friction material 108b face each other and define a partially enclosed volume 110 therebetween. The partially enclosed volume 110 accommodates the brake rotor 140 that rotates about the rotor axis A. The layers of friction material 108a, 108b are arranged to contact the brake rotor 140 when the brake pads 103a, 103b are actuated.

The backplates 107a, 107b are formed as generally flat plates made from a metal or a metal alloy, e.g., cast or stamped steel, and provide a structural support for the relatively brittle friction material 108a, 108b. The first backplate 107a includes a first backplate face 109a and the second backplate 107b includes a second backplate face 109b. Both the first backplate face 109a and the second backplate face 109b face the rotor plane P. The first 108a and the second 108b layers of friction material are mounted to the first 109a and the second 109b backplate faces respectively. The backplates 107a, 107b have a greater area than the friction material 108a, 108b. Mounting features are defined on the backplates 107a, 107b, radially outward of the friction material 108a, 108b, for mounting respective pad springs 132a, 132b.

The caliper 102 defines an aperture 111 within which the first 103a and the second 103b brake pads are partially received. The brake assembly 100 includes a pad retainer or pad strap 105 that bridges the aperture 111 and is releasably secured to the caliper 102. The pad retainer 105 is configured to help secure the brake pads 103a, 103b in the carrier 101 and help prevent the brake pads 103a, 103b from translating radially outwards through the aperture 111.

Note that the terms "radial", "radially", "circumferential" and "circumferentially" are used to define directions in a polar coordinate system relative to the rotor axis A as shown in FIG. 1, which illustrates schematically the radial direction r and the circumferential direction c.

The brake assembly 100 includes two pad retraction springs 104 which are mounted such that they engage both brake pads 103a, 103b and such that they are located radially outward of the partially enclosed volume 110. Each pad retraction spring 104 is a resilient member which provides a spring force F that urges the brake pads 103a, 103b away from the rotor plane P. As such, the pad retraction springs 104 help to retract the brake pads 103a, 103b in a direction away from the brake rotor 140 after braking has been applied; i.e., after the brake assembly 100 has been actuated such that the brake pads 103a, 103b translate towards the rotor plane P.

Advantageously, this inhibits the brake pads 103a, 103b from contacting the brake rotor 140, commonly referred to as rotor drag, when braking is not applied. This may help to reduce wearing of the friction materials 108a, 108b and the brake rotor 140, as well as help increase the fuel efficiency of a vehicle comprising the brake assembly 100.

With reference to FIGS. 5 to 7, each pad retraction spring 104 includes a first engaging portion 112a, a second engaging portion 112b and a bridging portion 114 interposed between the engaging portions 112a, 112b.

The bridging portion 114 includes a supporting portion 113 and two arms 116 extending from the supporting portion 113 towards the engaging portions 112a, 112b. As seen in FIG. 3, the rotor plane P intersects the bridging portion 114. The supporting portion 113 includes a coil 115 formed from a first turn 117a and a second turn 117b.

In this embodiment, the engaging portions 112a, 112b are substantially linear and are orientated at an oblique angle to the arms 116 to which they join. The first engaging portion 112a is aligned with the second engaging portion 112b such that the engaging portions 112a, 112b are substantially coaxial.

With further reference to FIGS. 1 to 4, it can be seen that the first engaging portion 112a engages the first backplate face 109a and the second engaging portion 112b engages the second backplate face 109b.

In the particular embodiment, the first backplate face 109a includes a first recess 118a and the second backplate face 109b includes a second recess 118b. The recesses 118a, 118b are located radially outward of the partially enclosed volume 110. Each recess 118a, 118b is a through bore and extends axially (i.e., along an axis parallel to rotor axis A) from the backplate faces 109a, 109b to the opposite faces of the backplates 107a, 107b.

However, in alternative embodiments (not shown), the recesses 118a, 118b may be blind bores in the backplate faces 109a, 109b.

The first engaging portion 112a is at least partially received in the first recess 118a and the second engaging portion 112b is at least partially received in the second recess 118b. The engaging portions 112a, 112b and the recesses 118a, 118b are correspondingly shaped such that the engaging portions 112a, 112b are inhibited from translating relative to the brake pads 103a, 103b in the radial and circumferential directions when received in the recesses 118a, 118b.

In the particular embodiment, both the engaging portions 112a, 112b and the recesses 118a, 118b have corresponding circular cross-sections. As such, the pad retraction springs 104 are able to rotate about an axis parallel to the rotor axis A with respect to the brake pads 103a, 103b.

In alternative embodiments (not shown), the engaging portions 112a, 112b may be secured to the recesses 118a, 118b via an interference fit, which inhibits the pad retraction springs 104 from rotating with respect to the brake pads 103a, 103b.

The pad retraction spring 104 imparts a spring force F, shown as a dashed arrow in FIG. 3, on the backplate faces 109a, 109b via the engaging portions 112a, 112b. In this embodiment, the coil 115 generates a torsional force which contributes to the spring force F. It will be appreciated that as the brake pads 103a, 103b translate towards the rotor plane P when the brakes are applied, the spring force F will increase. Hence, when the brakes are released, the spring force F will urge the brake pads 103a, 103b away from the rotor plane P.

The supporting portion 113 engages a stop surface 106 that is located on a radially outer face of the pad retainer 105. The pad retainer 105 is located radially outward of the partially enclosed volume 110. Hence, the abutment of the stop surface 106 and the supporting portion 113 inhibits the supporting portion 113 and therefore the pad retraction spring 104 from entering the partially enclosed volume 110 where it would interfere with operation of the brake assembly 100. In this embodiment, the pad retainer has two stop surfaces 106. The stop surfaces 106 are located on circumferentially outer surfaces 105b of the pad retainer 105. The pad retainer 106 has a centrally located trough 105a, located between the circumferentially outer surfaces 105b of the pad retainer 105. The trough 105a helps to increase stiffness of the pad retainer 105. The trough 105a is not engaged by the pad retraction spring 104.

Figure 4:
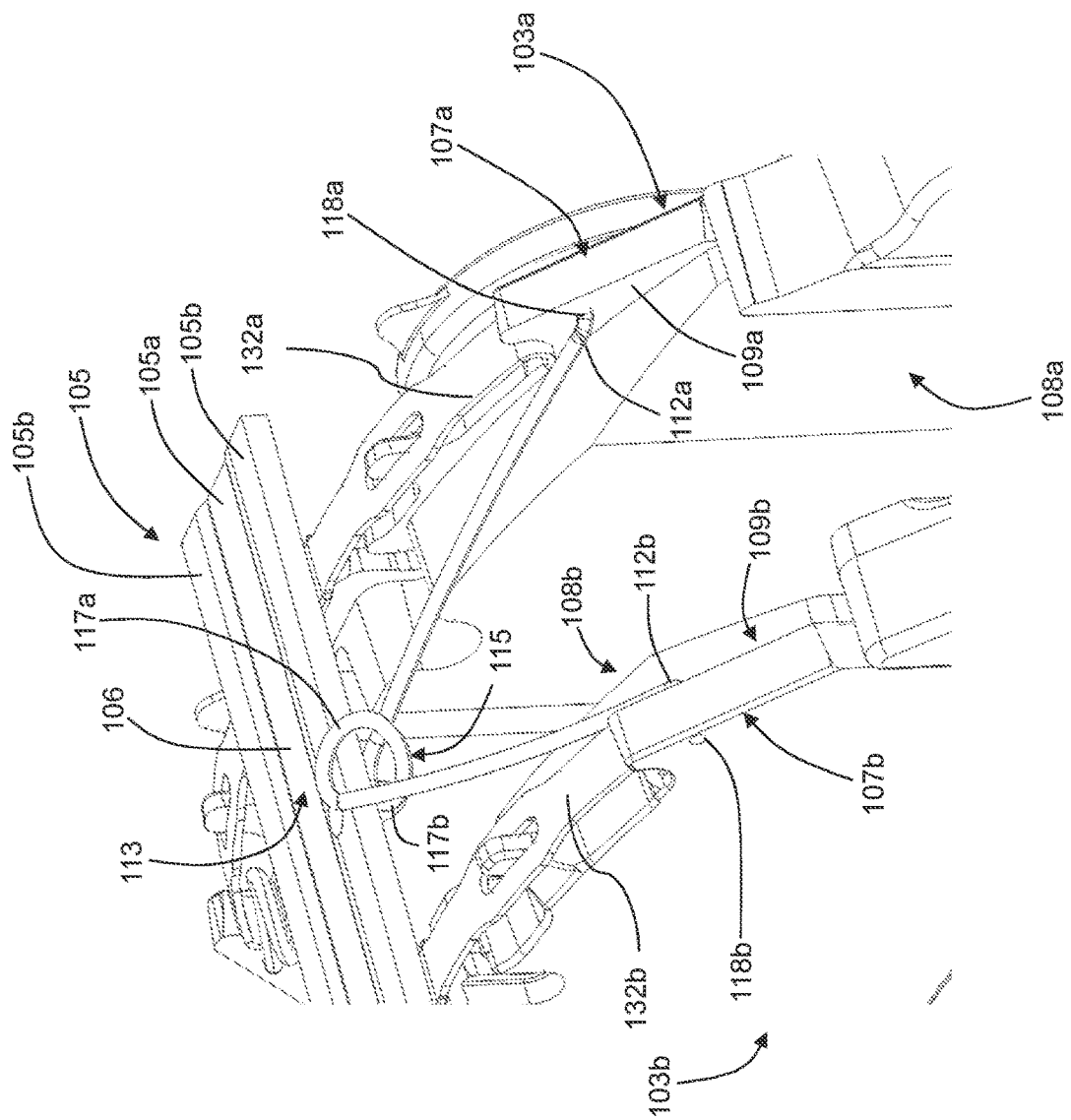
FIG. 4 is an isometric view of a number of isolated components of the brake assembly of FIG. 1.

As best shown in FIG. 4, it can be seen that the stop surface 106 is interposed between the first turn 117a and the second turn 117b of the coil 115. Hence, the combination of the engaging portions 112a, 112b being received in the recesses 118a, 118b and the supporting portion 113 engaging the stop surface 106 inhibits the pad retraction spring 104 from translating in the radial and circumferential directions, and from rotating about rotor axis A. In normal use, there is a typically a clearance between the first turn 117a of the coil 115 and the pad retainer and between the second turn 117b of the coil 115 and the pad retainer of around 1-2 mm. However, in some circumstances, the vehicle could hit a bump, for example, and the forces would urge the pad retraction spring away from its normal position. In this situation, the pad retraction spring 104 is inhibited from pivoting in the radially inward direction by engagement with one of the circumferentially outer surfaces 105b of the pad retainer 105. Specifically, a radially inner surface of the first turn 117a cannot translate in a radially inward direction because it will engage the circumferentially outer surface 105b. The pad retraction spring 104 is therefore inhibited from entering the partially enclosed volume 110. The pad retraction spring 104 is further inhibited from pivoting in a radially outward direction by engagement with a radially inner face (i.e., an underside) of one of the circumferentially outer surfaces 105b of the pad retainer 105. Specifically, a radially outer surface of the second turn 117b cannot translate in a radially outward direction because it will engage the radially inner face of the circumferentially outer surface 105b. Advantageously, this may prevent the pad retraction spring 104 from contacting a wheel, e.g., a wheel rim, proximate the brake assembly 100, which could potentially wear or cause damage to the pad retraction spring 104.

To fit the pad retraction spring 104 to the brake assembly 100, the stop surface 106 is first interposed between the first turn 117a and the second turn 117b of the coil 115. Subsequently, the arms 116 are compressed such that the engaging portions 112a, 112b move towards the rotor plane P, and the engaging portions 112a, 112b are then aligned with the recesses 118a, 118b. The arms 116 are subsequently released, such that the engaging portions 112a, 112b are received within the recesses 118a, 118b.

FIGS. 8 to 13 show a brake assembly 200 and components thereof according to a second embodiment of the present teachings.

The brake assembly 200 has several features in common with the brake assembly 100 of the first embodiment. Hence, corresponding features between the two embodiments share the same reference numerals, and a discussion of common features will not be repeated for brevity. Further, the brake assembly 200 shares the rotor axis A and polar coordinate system of the first embodiment, although they are not shown in FIGS. 8 to 13.

Figure 8:
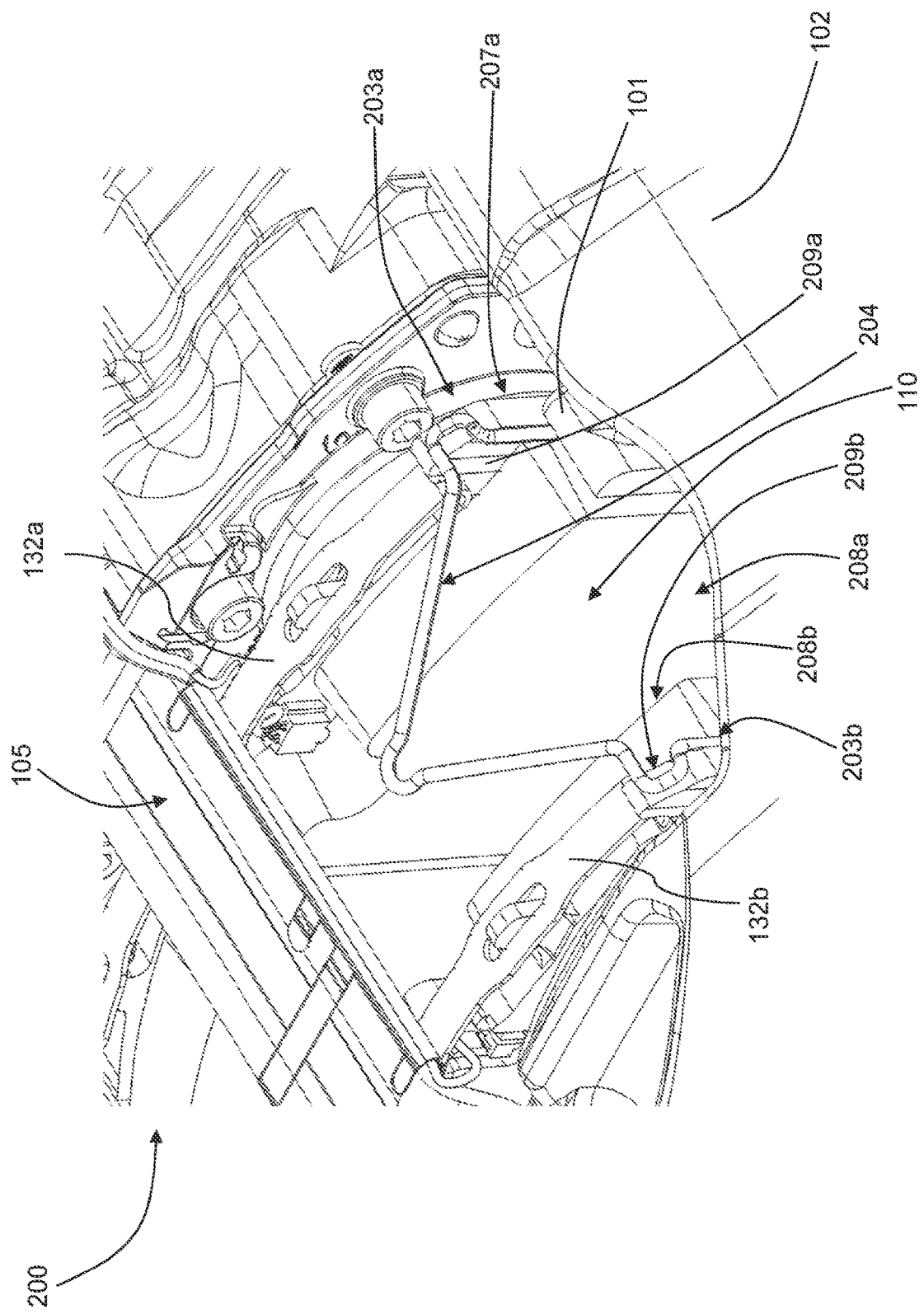
FIG. 8 is an isometric view of a brake assembly according to a second embodiment of the present teachings.
Figure 9:
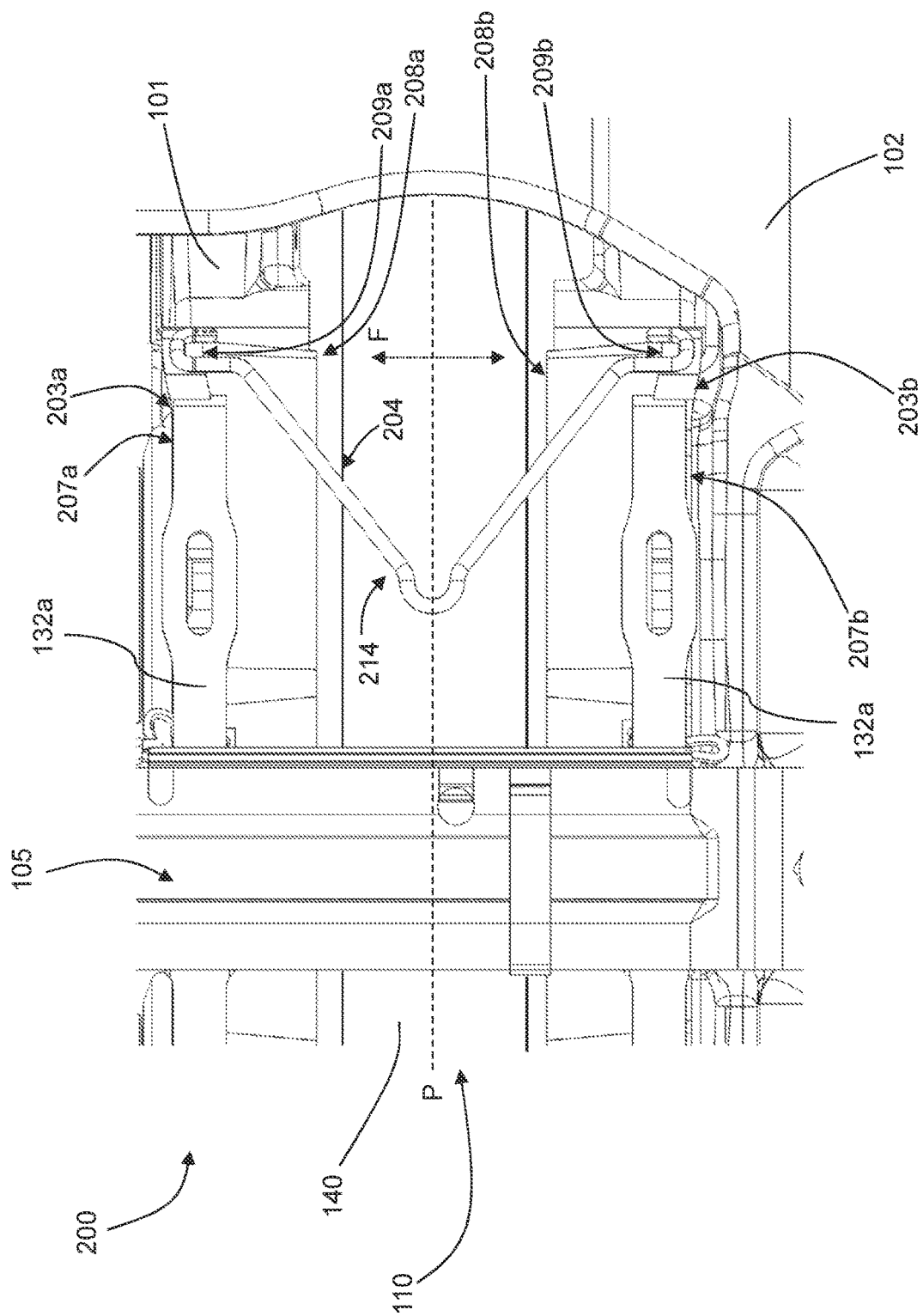
FIG. 9 is an upper view of the brake assembly of FIG. 8.

With reference to FIGS. 8 and 9, the brake assembly 200 includes a first brake pad 203a and a second brake pad 203b that are received in a brake carrier 101. The first brake pad 203a includes a first layer of friction material 208a mounted to a first backplate 207a, and the second brake pad 203b includes a second layer of friction material 208b mounted to a second backplate 207b. The layers of friction material 208a, 208b face a rotor plane P and therefore each other, and define a partially enclosed volume 110 therebetween for accommodating a brake rotor 140. The rotor plane P is disposed between the first and second brake pads 203a, 203b.

The first backplate 207a includes a first backplate face 209a and the second backplate 207b includes a second backplate face 209b. The backplates faces 209a, 209b face the rotor plane P. Further, the first friction material 208a is mounted to the first backplate face 209a and the second friction material 208b is mounted to the second backplate face 209b.

Figure 10:
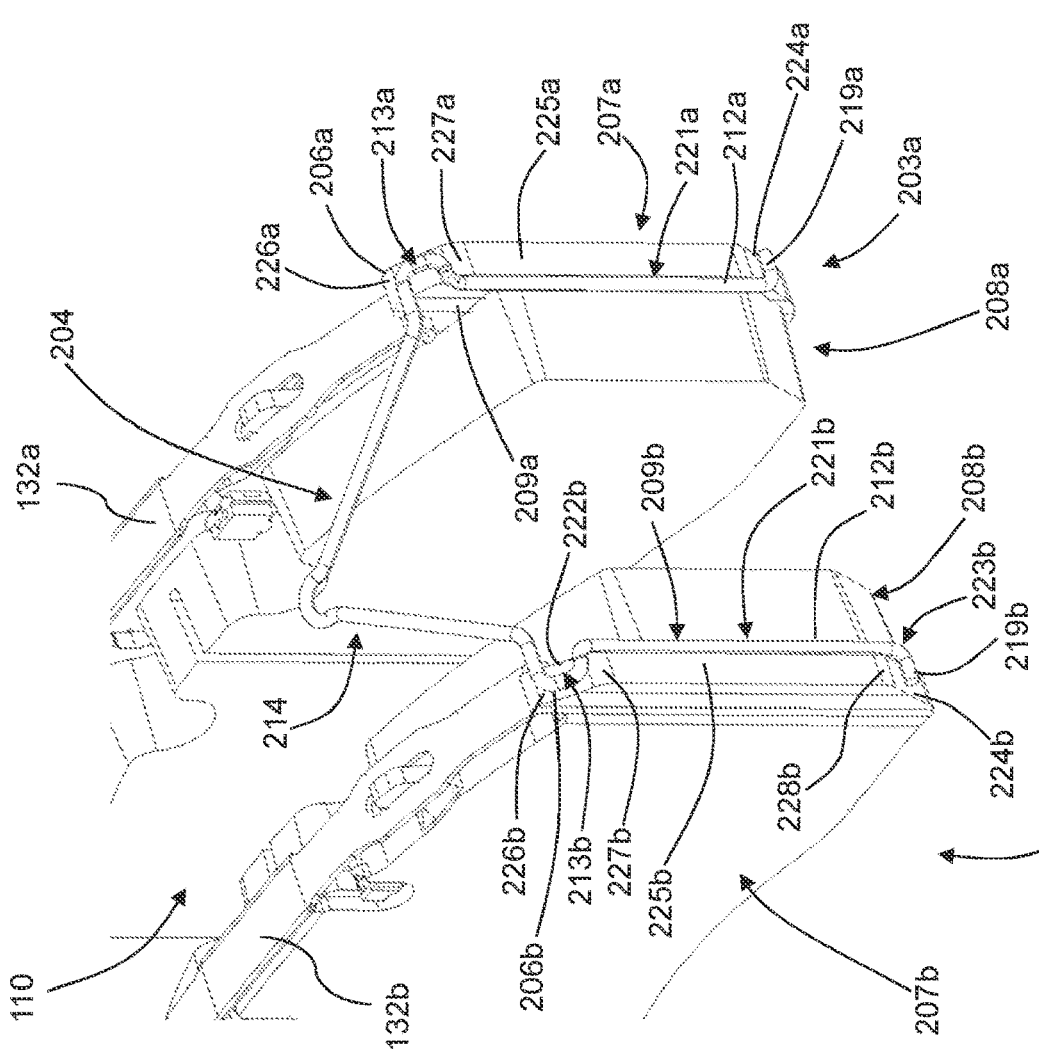
FIG. 10 is an isometric view of a number of isolated components of the brake assembly of FIG. 8.

The brake assembly 200 includes two pad retraction springs 204. Although only one pad retraction spring 204 is shown in FIGS. 8 to 10, it will be appreciated that a second pad retraction spring 204 may be located on the opposite circumferential side of the brake pads 203*a*, 203*b*.

The pad retraction springs 204 are mounted such that they engage both brake pads 203*a*, 203*b* and such that they are located radially outward of the partially enclosed volume 110. Each pad retraction spring 204 is a resilient member which provides a spring force F that urges the brake pads 203*a*, 203*b* in a direction away from the rotor plane P. As such, the pad retraction springs 204 help to retract the brake pads 203*a*, 203*b* away from the brake rotor 140 after braking has been applied; i.e., after the brake assembly 200 has been actuated such that the brake pads 203*a*, 203*b* translate towards the rotor plane P.

With reference to FIGS. 12 and 13, the pad retraction spring 204 includes a bridging portion 214, a first supporting portion 213*a*, a second supporting portion 213*b*, a first engaging portion 212*a*, a second engaging portion 212*b*, a first abutment portion 219*a* and a second abutment portion 219*b*.

The bridging portion 214 is interposed between the engaging portions 212*a*, 212*b*. As shown in FIG. 9, the rotor plane P intersects the bridging portion 214. The first supporting portion 213*a* is located between, i.e., interposed between, the bridging portion 214 and the first engaging portion 212*a*. Likewise, the second supporting portion 213*b* is located between the bridging portion 214 and the second engaging portion 212*b*.

The bridging portion 214 includes an arched linking portion 220 and two arms 216 extending from the arched linking portion 220 at an oblique angle towards the supporting portions 213*a*, 213*b* to which they join.

The engaging portions 212*a*, 212*b* are linear and extend from the supporting portions 213*a*, 213*b* to the abutment portions 219*a*, 219*b*.

The first abutment portion 219*a* extends from and is orientated at a non-zero angle to the first engaging portion 212*a*, and the second abutment portion 219*b* extends from and is orientated at a non-zero angle to the second engaging portion 212*b*. In the particular embodiment shown, the abutment portions 219*a*, 219*b* are orientated substantially perpendicular to the engaging portions 212*a*, 212*b*. However, in alternative embodiments (not shown), the abutment portions 219*a*, 219*b* may be orientated greater than or less than ninety degrees relative to the engaging portions 212*a*, 212*b*.

As can be most clearly seen in FIG. 13, the pad retraction spring 204 is symmetrical about the rotor plane P. As such, the first supporting portion 213*a* is substantially a mirror image of the second supporting portion 213*b* about the rotor plane P, the first engaging portion 212*a* is substantially a mirror image of the second engaging portion 212*b* about the rotor plane P, and the first abutment portion 219*a* is substantially a mirror image of the second abutment portion 219*b* about the rotor plane P.

However, in alternative embodiments (not shown), one or more of the supporting portions 213*a*, 213*b*, the engaging portions 212*a*, 212*b*, and the abutment portions 219*a*, 219*b*, may not be symmetrical about the rotor plane P.

With further reference to FIG. 10, the first engaging portion 212*a* engages the first backplate face 209*a* and the second engaging portion 212*b* engages the second backplate face 209*b*. As such, the spring force F of the pad retraction spring 204 is imparted to the brake pads 203*a*, 203*b* via the engagement of the engaging portions 212*a*, 212*b* and the backplate faces 209*a*, 209*b*. The spring force F acts to urge the brake pads 203*a*, 203*b* in a direction away from the rotor plane P.

Figure 11:
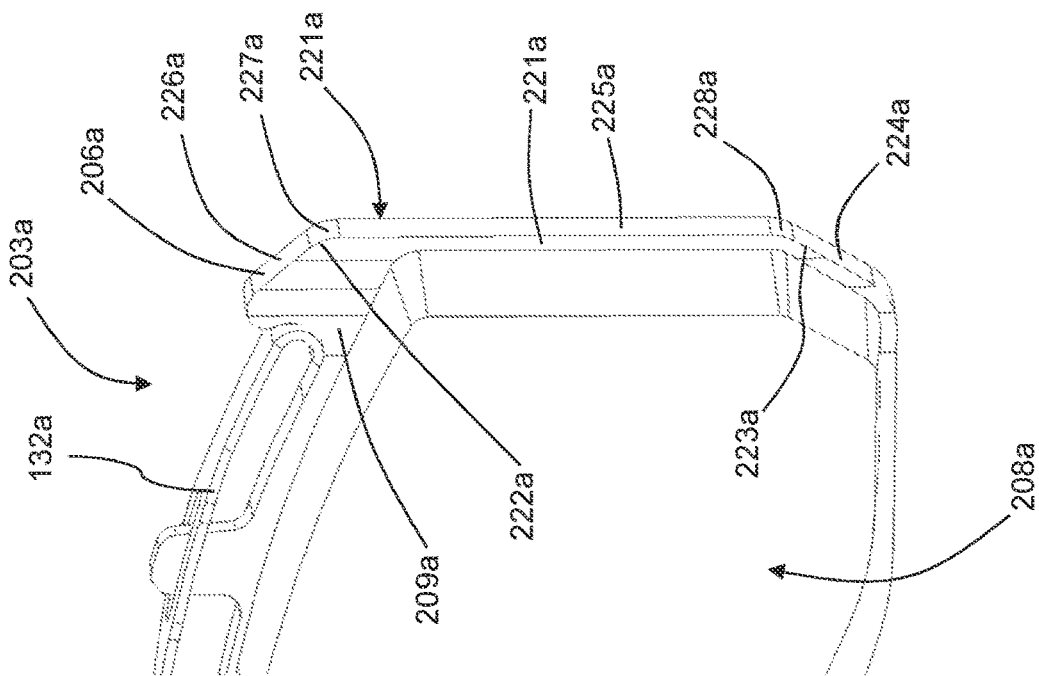
FIG. 11 is a partial isometric view of a brake pad of the brake assembly of FIG. 8.

FIG. 11 shows a partial view of the first brake pad 203*a* without the pad retraction spring 204. It can be seen that the first backplate face 209*a* includes a first circumferential end region 221*a* where the first friction material 208*a* is recessed. By "circumferential end region", it is meant a region of the first backplate face 209*a* that is proximate a circumferential limit of the first backplate 207*a*. Likewise, the second backplate face 209*b* also includes a second circumferential region 221*a* where the second friction material 208*b* is recessed.

The first circumferential end region 221*a* extends from a first radially outer edge 222*a* to a first radially inner edge 223*a* of the first backplate face 209*a*. Likewise, the second circumferential end region 221*b* extends from a second radially outer edge 222*b* to a second radially inner edge 223*b* of the second backplate face 209*b*.

It can also be seen in FIG. 11 that the first backplate 207*a* includes a first circumferential end surface 225*a*, a first backplate radially outer surface 226*a* and a first backplate radially inner surface 224*a*; all three surfaces 224*a*, 225*a*, 226*a* being substantially perpendicular to the first backplate face 209*a*. The first backplate radially outer surface 226*a* joins the first circumferential end surface 225*a* at a first radially outer corner region 227*a*. Likewise, the first backplate radially inner surface 224*a* joins the first circumferential end surface 225*a* at a first radially inner corner region 228*a*.

The first backplate radially outer surface 226*a* and the first backplate radially inner surface 224*a* are both orientated at a non-zero angle to the first circumferential end surface 225*a*. In the illustrated embodiment, the radially outer surface 226*a* and the radially inner surface 224*a* are orientated at an oblique angle to the circumferential end surface 225*a*. However, in alternative embodiments (not shown), the radially outer surface 226*a* and/or the radially inner surface 224*a* may be orientated perpendicular or at an acute angle to the circumferential end surface 225*a*.

The second backplate 207*b* includes a second circumferential end surface 225*b*, a second backplate radially outer surface 226*b*, a second backplate radially inner surface 224*b*, a second radially outer corner region 227*b* and a second radially inner corner region 228*b* in a similar arrangement as the first backplate 207*a*.

Turning to FIG. 10, it can be seen that the first engaging portion 212*a* engages the first circumferential end region 221*a* and the second engaging portion 212*a* engages the second circumferential end region 221*b*.

In the illustrated embodiment, the engaging portions 212*a*, 212*b* engage the entirety of the circumferential end regions 221*a*, 221*b* from the radially outer edges 222*a*, 222*b* to the radially inner edges 223*a*, 223*b*. However, in alternative embodiments (not shown), the engaging portions 212*a*, 212*b* may not engage the entirety of the circumferential end regions 221*a*, 221*b*, and instead may engage a majority of the circumferential end regions 221*a*, 221*b*. For example, the engaging portions 212*a*, 212*b* may terminate before reaching the radially inner edges 223*a*, 223*b*. In such embodiments, the pad retraction spring 204 may not include abutment portions 219*a*, 219*b*, or the abutment portions 219*a*, 219*b* may join the engagement portions 212*a*, 212*b* via connection portions adjacent the circumferential end surfaces 225*a*, 225*b*.

The circumferential end regions 221*a*, 221*b* have a circumferential width, i.e., a width aligned with the circumferential direction, which is greater than or equal to the thickness of the engaging portions 212a, 212b. In the illustrated embodiment, the pad retraction spring 204 is formed from a unitary length of wire of uniform thickness. Hence, the circumferential width of the circumferential end regions 221a, 221b is greater than or equal to the thickness of the wire from which the pad retraction spring 204 is formed. As such, the pad retraction spring 204 does not interfere with the abutment of the circumferential end surfaces 225a, 225b of the brake pads 203a, 203b and the brake carrier 101 to which the brake pads 203a, 203b are mounted.

The layers of friction material 208a, 208b have an axial thickness, i.e., a thickness aligned with the axial direction, which varies as the layers of friction material 208a, 208b wear away during use. The axial thickness of the friction materials 208a, 208b is greater when the friction materials 208a, 208b are unworn relative to when they are fully worn. In the fully worn condition, the axial thickness of the friction materials 208a, 208b corresponds to a predetermined non-zero value. For example, a typical minimum thickness of the friction materials 208a, 208b is around 3 mm. The thickness of each engaging portion 212a, 212b is chosen to be less than or equal to the axial thickness of the friction materials 208a, 208b in their fully worn condition. This helps to prevent the pad retraction spring 204 from contacting the brake rotor 140 when the friction materials 208a, 208b are fully worn.

FIG. 10 shows that the first abutment portion 219a abuts the first backplate radially inner surface 224a and the second abutment portion 219b abuts the second backplate radially inner surface 224b. As such, the pad retraction spring 204 is inhibited from translating in a radially outward direction.

The first supporting portion 213a abuts a first stop surface 206a located on the first backplate radially outer surface 226a and the second supporting portion 213b abuts a second stop surface 206b located on the second backplate radially outer surface 226b. The stop surfaces 206a, 206b are both located radially outward of the partially enclosed volume 110.

The abutment of the supporting portions 213a, 213b and the stop surfaces 206a, 206b inhibits the pad retraction spring 204, which is located radially outward of the partially enclosed volume 110, from entering the partially enclosed volume 110. Further, the combination of the abutment portions 219a, 219b abutting the backplate radially inner surfaces 224a, 224b and the supporting portions 213a, 213b abutting the stop surfaces 206a, 206b inhibits movement of the pad retraction spring 204 in the radial direction.

The first stop surface 206a is orientated at a non-zero angle to the first backplate face 209a. Likewise, the second stop surface 206b is orientated at a non-zero angle to the second backplate face 209b. In the illustrated embodiment, the first and second stop surfaces 206a, 206b are substantially perpendicular to the first and the second backplate faces 209a, 209b respectively.

With reference to FIGS. 10 and 13, the first supporting portion 213a includes a plurality of bends 229a, 229b, 229c that allow the first supporting portion 213a to abut the first stop surface 206a and the first engaging portion 212a to engage the first backplate face 209a. Likewise, the second supporting portion 213b includes a plurality of bends 229a, 229b, 229c that allow the second supporting portion 213b to abut the second stop surface 206b and the second engaging portion 212b to engage the second backplate face 209b.

In the illustrated embodiment, the supporting portions 213a, 213b each include three bends 229a, 229b, 229c: i) a bend 229a between one of the arms 216 and a first linear portion 230; ii) a bend 229b between the first linear portion 230 and a second linear portion 231; and iii) a bend 229c between the second linear portion 231 and the respective engaging portion 212a, 212b.

The second linear portions 231 abut the stop surfaces 206a, 206b over a relatively large contact area, relative to if each supporting portion 213a, 213b contacted each stop surface 206a, 206b exclusively via a single bend. This increases the rigidity of the pad retraction spring 204 and helps to inhibit the pad retraction spring 204 from entering the partially enclosed volume 110.

In alternative embodiments (not shown) one or both of the supporting portions 213a, 213b may include only two bends. For example, one or both supporting portions 213a, 213b may include a bend between one of the arms 216 and a linear portion, and a bend between the linear portion and the respective engaging portion 212a, 212b. In some alternative embodiments (not shown), one or both of the supporting portions 213a, 213b may include four or more bends.

It will be appreciated that in alternative embodiments (not shown), the pad retraction spring 204 may include only the first supporting portion 213a, where the first supporting portion 213a is configured to abut the first stop surface 206a. In such embodiments, the second engaging portion 212b may be joined to the bridging portion 214 via one bend proximate the second radially outer edge 222b.

To fit the pad retraction spring 204 to the brake assembly 200, the engaging portions 212a, 212b are compressed such that they move towards one another. Ensuring the bridging portion 214 is radially outward of the partially enclosed volume 110, the engaging portions 212a, 212b are aligned with the circumferential end regions 221a, 221b, the supporting portions 213a, 213b are aligned with the stop surfaces 206a, 206b and the abutment portions 219a, 219b are aligned with the backplate radially inner surfaces 224a, 224b. Subsequently, the engaging portions 212a, 212b are released such that the engaging portions 212a, 212b engage the circumferential end regions 221a, 221b, the supporting portions 213a, 213b abut the stop surfaces 206a, 206b, and the abutment portions 219a, 219b abut the backplate radially inner surfaces 224a, 224b.

FIGS. 14 to 19 show a brake assembly 300 and components thereof according to a third embodiment of the present teachings.

The brake assembly 300 has several features in common with the brake assembly 100 of the first embodiment. Hence, corresponding features between the two embodiments share the same reference numerals, and a discussion of common features will not be repeated for brevity. Further, the brake assembly 300 shares the rotor axis A and polar coordinate system of the first embodiment, although they are not shown in FIGS. 14 to 19.

Figure 14:
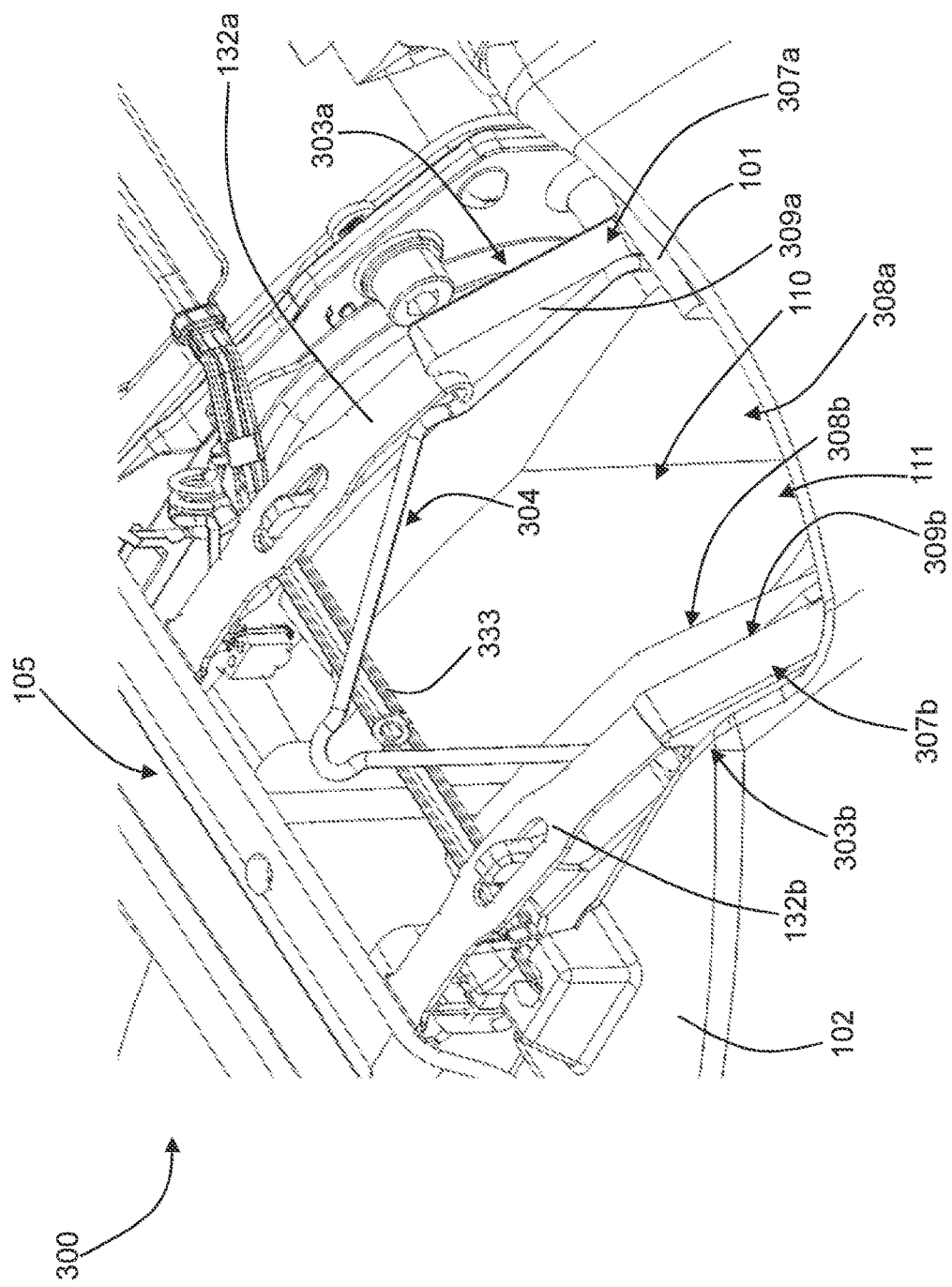
FIG. 14 is an isometric view of a brake assembly according to a third embodiment of the present teachings.
Figure 15:
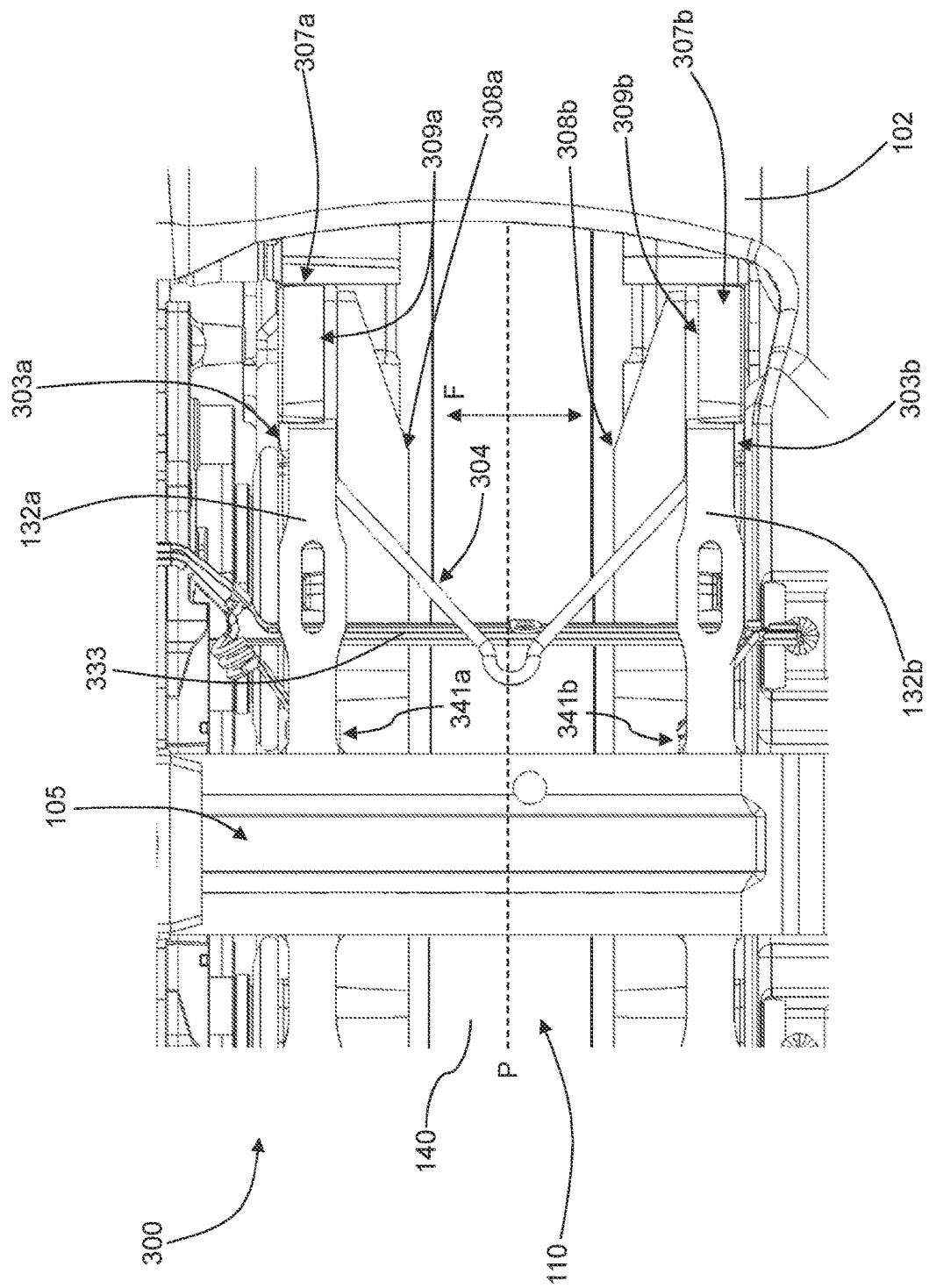
FIG. 15 is an upper view of the brake assembly of FIG. 14.

With reference to FIGS. 14 and 15, the brake assembly 300 includes a first brake pad 303a and a second brake pad 303b that are received in a brake carrier 101. The first brake pad 303a includes a first layer of friction material 308a mounted to a first backplate 307a, and the second brake pad 303b includes a second layer of friction material 308b mounted to a second backplate 307b. The layers of friction material 308a, 308b face a rotor plane P and therefore each other, and define a partially enclosed volume 110 therebetween for accommodating a brake rotor 140. The rotor plane P is disposed between the first and second brake pads 303a, 303b.

The brake assembly 300 includes electrical cabling 333 that bridges the aperture 111 in the caliper 102. The cabling 333 runs substantially parallel to the pad retainer 105.

In the illustrated embodiment, the cabling 333 connects a first brake pad wear sensor 341a mounted to the first backplate face 309a to a second brake pad wear sensor 341b mounted to the second backplate face 309b (see FIG. 15). When the friction materials 308a, 308b are fully worn, the first and the second wear sensors 341a, 341b contact brake rotor 140 which wears through a portion of the cabling embedded therein and breaks a circuit. This causes an indicator to be displayed to an operator of a vehicle (not shown) comprising the brake assembly 300 notifying them that the brake pads 303a, 303b need to be replaced.

The first backplate 307a includes a first backplate face 309a and the second backplate 307b includes a second backplate face 309b. The backplates faces 309a, 309b face the rotor plane P. Further, the first friction material 308a is mounted to the first backplate face 309a and the second friction material 308b is mounted to the second backplate face 309b.

The first brake pad 303a includes a first pad spring 132a mounted on a radially outer portion of the first backplate 307a, and the second brake pad 303b includes a second pad spring 132b mounted on a radially outer portion of the second backplate 307b. The pad springs 132a, 132b abut against a radially inner surface of the pad retainer 105 and are configured to exert a biasing force against the brake pads 303a, 303b that helps to hold the brake pads 303a, 303b against the brake carrier 101.

As best seen in FIG. 15, the pad springs 132a, 132b are not flush with the backplate faces 309a, 309b, and instead extend proud of the backplate faces 309a, 309b towards the rotor plane P.

Figures 16, 17:
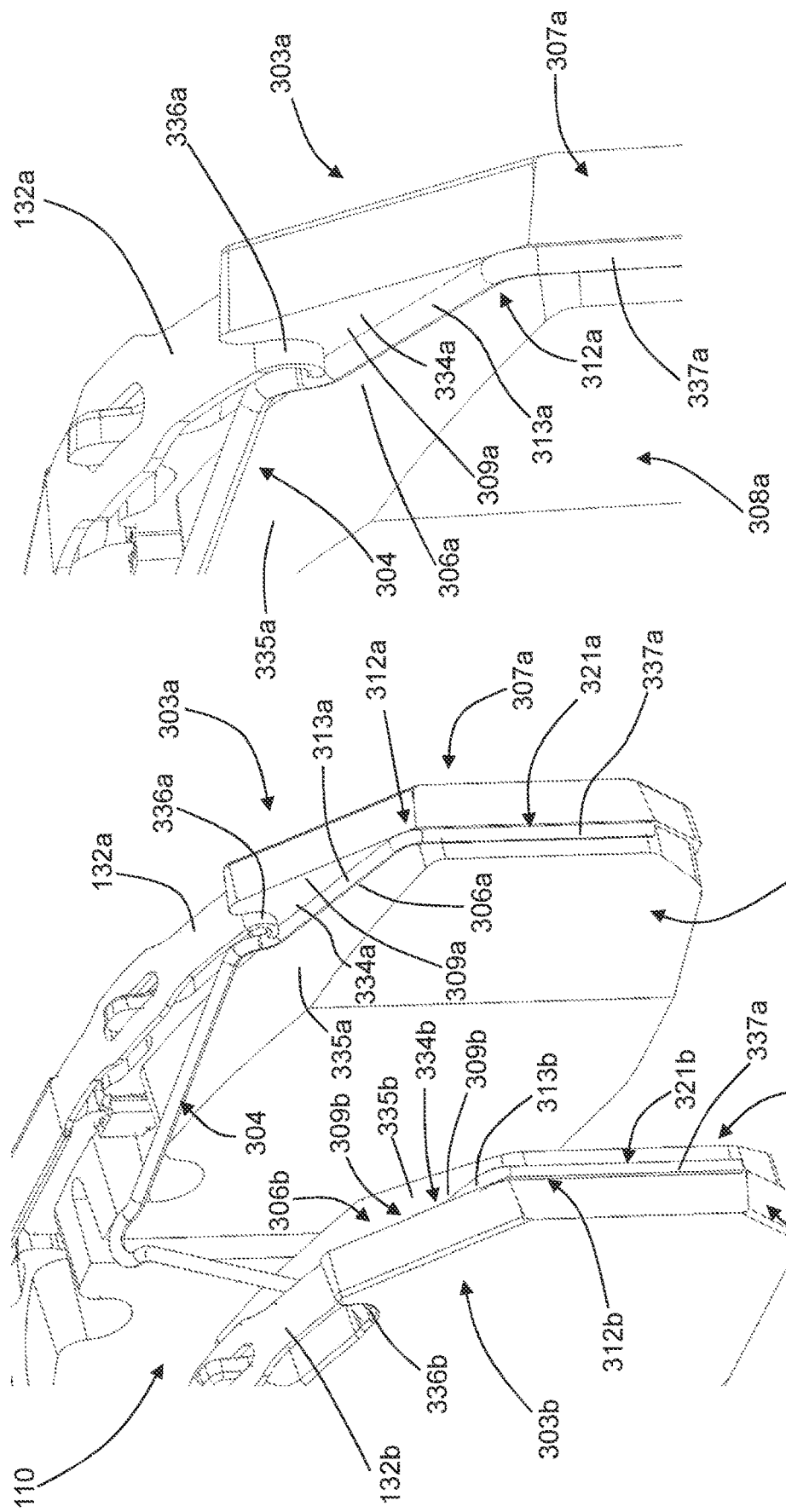
FIG. 16 is an isometric view of a number of isolated components of the brake assembly of FIG. 14.
FIG. 17 is a magnified view of FIG. 16.

The brake assembly 300 includes two pad retraction springs 304. Although only one pad retraction spring 304 is shown in FIGS. 14 to 16, it will be appreciated that a second pad retraction spring 304 may be located on the opposite circumferential side of the brake pads 303a, 303b.

The pad retraction springs 304 are mounted such that they engage both brake pads 303a, 303b and such that they are located radially outward of the partially enclosed volume 110. The pad retraction springs 304 are partially located radially outward of the cabling 333 such that they do not contact the cabling 333.

Each pad retraction spring 304 is a resilient member which provides a spring force F that urges the brake pads 303a, 303b away from the rotor plane P. As such, the pad retraction springs 304 help to retract the brake pads 303a, 303b away from the brake rotor 140 after braking has been applied; i.e., after the brake assembly 300 has been actuated such that the brake pads 303a, 303b translate towards the rotor plane P.

Figure 19:
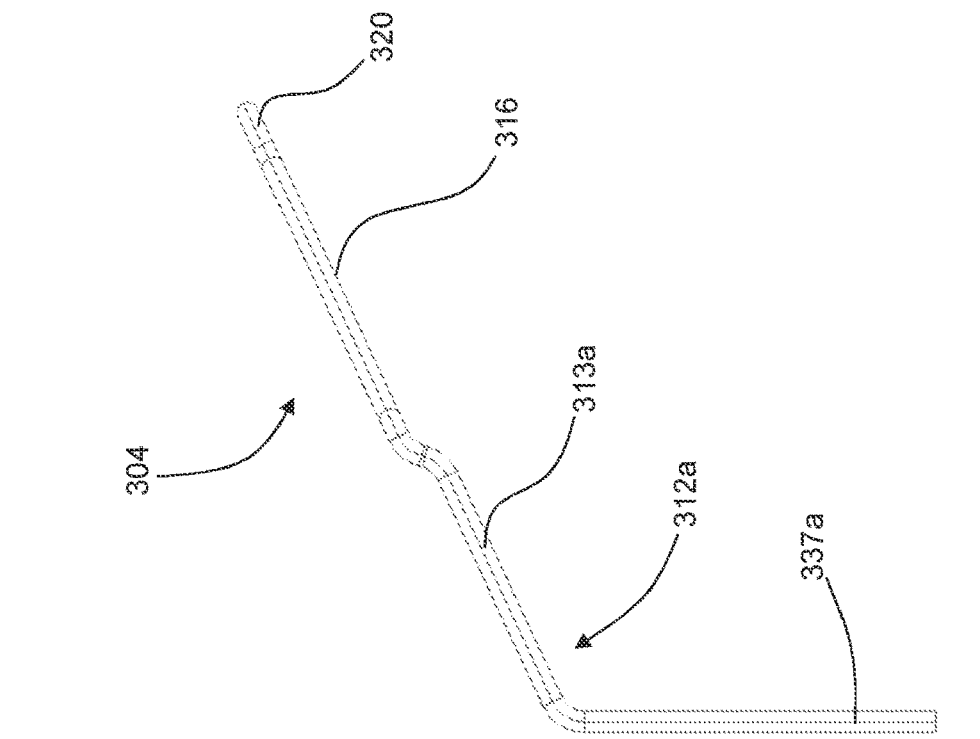
FIG. 19 is a side view of the pad retraction spring of FIG. 18.
Figure 18:
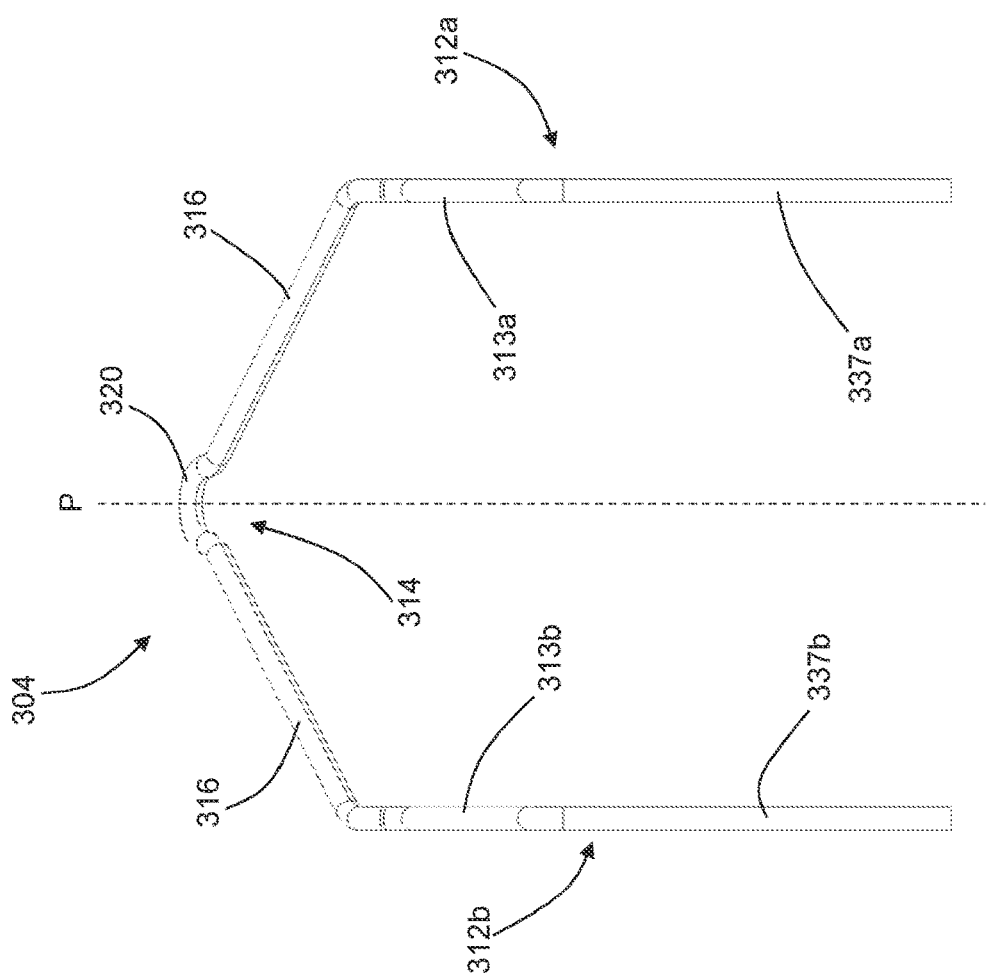
FIG. 18 is a rear view of a pad retraction spring of the brake assembly of FIG. 14.

With reference to FIGS. 18 and 19, the pad retraction spring 304 includes a bridging portion 314, a first supporting portion 313a, a second supporting portion 313b, a first engaging portion 312a and a second engaging portion 312b.

The bridging portion 314 is interposed between the supporting portions 313a, 313b. As shown in FIG. 15, the rotor plane P intersects the bridging portion 314. The bridging portion 314 includes an arched linking portion 320 and two arms 316 extending from the arched linking portion 320 at an oblique angle towards the supporting portions 313a, 313b to which they join.

As will be discussed more below, the first engaging portions 312a includes the first supporting portion 313a and a first end portion 337a which is orientated at an oblique angle to the first supporting portion 313a. Likewise, the second engaging portions 312b includes the second supporting portion 313b and a second end portion 337b which is orientated at an oblique angle to the second supporting portion 313b.

As can be most clearly seen in FIG. 18, the pad retraction spring 304 is symmetrical about the rotor plane P. As such, the first supporting portion 313a is substantially a mirror image of the second supporting portion 313b about the rotor plane P, and the first engaging portion 312a is substantially a mirror image of the second engaging portion 312b about the rotor plane P.

However, in alternative embodiments (not shown), one or both of the supporting portions 313a, 313b, and the end portions 337a, 337b may not be symmetrical about the rotor plane P.

With further reference to FIGS. 16 and 17, the first engaging portion 312a engages the first backplate face 309a and the second engaging portion 312b engages the second backplate face 309b. As such, the spring force F of the pad retraction spring 304 is imparted to the brake pads 303a, 303b via the engagement of the engaging portions 312a, 312b and the backplate faces 309a, 309b. The spring force F acts to urge the brake pads 303a, 303b in a direction away from the rotor plane P.

As previously discussed, the engaging portions 312a, 312b include the supporting portions 313a, 313b and the end portions 337a, 337b. Both the supporting portions 313a, 313b and the end portions 337a, 337b engage the backplate faces 309a, 309b.

The first end portion 337a engages a first circumferential end region 321a and the second end portion 337b engages a second circumferential end region 321a, in a similar fashion as in the brake assembly 200 of the second embodiment.

The first supporting portion 313a engages a first circumferential inner region 334a of the first backplate face 309a where the first friction material 308a is recessed. By "circumferential inner region", it is meant a region of the first backplate face 309a that is circumferentially spaced from the first circumferential end region 321a. Likewise, the second supporting portion 313b engages a second circumferential inner region 334b of the second backplate face 309b where the second friction material 308b is recessed.

As well as engaging the backplate faces 309a, 309b, the supporting portions 313a, 313b abut stop surfaces 306a, 306b included in the brake assembly 300. The first supporting portion 313a abuts a first stop surface 306a located on a first friction radially outer surface 335a of the first friction material 308a, and the second supporting portion 313b abuts a second stop surface 306b located on a second friction radially outer surface 335b of the second friction material 308b. The stop surfaces 306a, 306b are located radially outwards of the partially enclosed volume 110. As such, the pad retraction spring 304 is inhibited from entering the partially enclosed volume 110.

As most clearly seen in FIG. 17, the first engaging portion 312a is partially interposed between the first pad spring 132a and the first friction material 308a. Likewise, although not clearly shown in the figures, the second engaging portion 312b is partially interposed between the second pad spring 132b and the second friction material 308b. As such, the pad retraction spring 304 is inhibited from moving in the radial direction with respect to the brake pads 303a, 303b.

In the illustrated embodiment, the supporting portions 313a, 313b, which form part of the engaging portions 312a, 312b, are secured via an interference fit between spring mounts 336a, 336b located at the circumferential ends of the pad springs 132a, 132b and the stop surfaces 306a, 306b. The interference fit further inhibits the pad retraction spring 304 from moving in the circumferential direction with respect to the brake pads 303a, 303b.

However, in alternative embodiments (not shown), the engaging portions 312a, 312b may be loosely retained between the pad springs 132a, 132b and the layers of friction material 308a, 308b.

It will be appreciated that in alternative embodiments (not shown), the pad retraction spring 304 may include only the first supporting portion 313a, where the first supporting portion 313a is configured to abut the first stop surface 306a. In such embodiments, the second engaging portion 312a may be configured to engage the second circumferential end region 321b exclusively and may not be interposed between the second friction material 308b and the second pad spring 132b.

To fit the pad retraction spring 304 to the brake assembly 300, the engaging portions 312a, 312b are compressed such that the first engaging portion 312a is translated towards the second engaging portion 312b. Ensuring the bridging portion 314 is radially outward of the partially enclosed volume 110, the end portions 337a, 337b are aligned with the circumferential end regions 321a, 321b, and the supporting portions 313a, 313b are aligned with the stop surfaces 306a, 306b. Subsequently, the engaging portions 312a, 312b are released such that the end portions 337a, 337b engage the circumferential end regions 321a, 321b, the supporting portions 313a, 313b abut the stop surfaces 306a, 306b, and the engaging portions 312a, 312b are interposed between the friction materials 308a, 308b and the pad springs 132a, 132b.

The pad retraction springs 104, 204, 304 are typically formed from a metallic material. Specifically, particularly suitable materials are corrosion resistant materials such as stainless steel, or a carbon steel with a corrosion resistant coating. For each of the brake assemblies 100, 200, 300 discussed, the pad retraction springs 104, 204, 304 are, in these embodiments, formed as a unitary body from wire with a constant circular cross-section. The pad retraction springs 104, 204, 304 are typically manufactured by bending a length of wire into the desired shapes.

However, in alternative embodiments (not shown), the pad retraction springs 104, 204, 304, may not have a constant circular cross-section. Instead, the pad retraction springs 104, 204, 304 could be formed from strips of resilient material with a thin rectangular cross-section to form, for example, a leaf spring. Other suitable arrangements could be envisaged by the skilled person for producing the spring force F to urge the brake pads away from the rotor.

The spring force F required to help retract the brake pads is low. Typically, a force of about 100 N per pad retraction spring 104, 204, 304 will be sufficient to help retract the pads, as once actuation has been released, there is low resistance to overcome to retract the pads. This low spring force helps to ensure that assembly of the brake assembly 100, 200, 300 is relatively easy; no specialist or heavy duty tools are required to compress the pad retraction springs 104, 204, 304 to fit the pad retraction springs 104, 204, 304 between the brake pads 103a, 103b, 203a, 203b, 303a, 303b. Further, the effect on the efficiency of the brake assembly 100, 200, 300 is minimal—typically, the actuation force applied is in the region of 200 kN, significantly higher than the opposing spring force F.

As the rotor 140 and friction material 108a, 108b, 208a, 208b, 308a, 308b wears, the spring force F will cause the pad retraction springs 104, 204, 304 to axially compress to ensure that they remain in contact with the brake pads 103a, 103b, 203a, 203b, 303a, 303b. Typically, an unworn rotor 140 has a thickness of around 45 mm, with an air-gap to the brake pads 103a, 103b, 203a, 203b, 303a, 303b of at least 1 mm to account for thermal expansion, etc. A worn rotor 140 will typically have a thickness of around 37 mm. Each brake pad 103a, 103b, 203a, 203b, 303a, 303b typically has friction material 108a, 108b, 208a, 208b, 308a, 308b with a thickness of around 22 mm in an unworn condition. The minimum thickness of the friction material 108a, 108b, 208a, 208b, 308a, 308b in the worn condition is around 3 mm. Accordingly, the axial travel of each pad retraction spring 104, 204, 304 over the life of the brake assembly is around 45 mm, i.e., each retraction spring 104, 204, 304 must expand at least 45 mm in the axial direction to perform its function for the life of the brake assembly 100, 200, 300.

For each of the brake assembly 100, 200, 300 embodiments discussed, it will be appreciated that the pad retraction spring 104, 204, 304 is configured to be releasably mounted to the brake assembly 100, 200, 300. The pad retraction spring 104, 204, 304 is held to the brake assembly 100, 200, 300 by the spring force F and does not require any additional components for fixing or mounting to the brake assembly 100, 200, 300. The pad retraction spring 104, 204, 304 is fitted to or removed from the brake assembly 100, 200, 300 by compressing or releasing the pad retraction spring 104, 204, 304 such that the engaging portions translate towards or away from each other. Advantageously, this allows the pad retraction spring 104, 204, 304 to be quickly and simply replaced.

In the foregoing disclosure, three brake assembly embodiments 100, 200, 300 have been discussed. However, it will be appreciated by those skilled in the art that features from each of the embodiments may be incorporated into one or both of the other two embodiments.

For example, it will be appreciated that in the brake assemblies 200, 300 of the second and third embodiments, the bridging portion 214, 314 may include a supporting portion that is configured to abut a stop surface on the pad retainer 105, such as in the brake assembly 100 of the first embodiment. Further, the bridging portion 214, 314 may include a coil with first and second turns that are configured to engage a stop surface on the pad retainer 105.

For example, it will be appreciated that in the brake assemblies 200, 300 of the second and third embodiments, one or both of the engaging portions 212a, 212b, 312a, 312b could be at least partially received in recesses in the backplate faces 209a, 209b, 309a, 309b, in a similar fashion to the brake assembly 100 of the first embodiment.

For example, it will be appreciated that in the brake assembly 300 of the third embodiment, abutment portions may extend from the end portions 337a, 337b and abut radially inner surfaces of the backplates 307a, 307b in a similar fashion to the brake assembly 200 of the second embodiment.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly for a heavy duty vehicle comprising:
a brake carrier;
a caliper that is mounted to the brake carrier;

a first brake pad that is received in the brake carrier, the first brake pad having a first backplate and a first friction material;

a second brake pad that is received in the brake carrier, the second brake pad having a second backplate and a second friction material;

a pad retraction spring having a first supporting portion, a first engaging portion and a second engaging portion; and a first stop surface;

wherein the first friction material and the second friction material face each other and define a partially enclosed volume therebetween for accommodating a brake rotor, the first stop surface is located radially outward of the partially enclosed volume, and a rotor plane is disposed between the first brake pad and the second brake pad;

wherein the first backplate comprises a first backplate face and the second backplate comprises a second backplate face, the first and second backplate faces facing the rotor plane;

wherein the first engaging portion of the pad retraction spring engages the first backplate face and the second engaging portion of the pad retraction spring engages the second backplate face, the pad retraction spring urging the first and second brake pads in a direction away from the rotor plane, wherein the first supporting portion is configured to abut the first stop surface such that the pad retraction spring is inhibited from entering the partially enclosed volume; and wherein the caliper comprises an aperture and the brake assembly comprises a pad retainer that bridges the aperture and is secured to the caliper, the pad retainer being located radially outward of the partially enclosed volume, wherein the pad retainer comprises the first stop surface.

2. The brake assembly of claim 1 wherein the first stop surface is located on a radially outer face of the pad retainer and the pad retraction spring comprises a bridging portion interposed between the first and second engaging portions, the rotor plane intersecting the bridging portion, wherein the bridging portion comprises the first supporting portion, and wherein the first supporting portion engages the first stop surface.

3. The brake assembly of claim 2 wherein the first supporting portion comprises a coil formed from at least a first turn and a second turn, and wherein the first stop surface is interposed between the first turn and the second turn.

4. The brake assembly of claim 1 wherein the first backplate face comprises a first circumferential end region where the first friction material is recessed and the second backplate face comprises a second circumferential end region where the second friction material is recessed, wherein the first engaging portion engages the first circumferential end region and the second engaging portion engages the second circumferential end region.

5. The brake assembly of claim 4 wherein the first circumferential end region extends from a first radially outer edge to a first radially inner edge of the first backplate face, and the second circumferential end region extends from a second radially outer edge to a second radially inner edge of the second backplate face, and wherein the first engaging portion engages a majority of the first circumferential end region and the second engaging portion engages a majority of the second circumferential end region.

6. The brake assembly of claim 4 wherein the first backplate comprises a first backplate radially inner surface, the second backplate comprises a second backplate radially inner surface and the pad retraction spring further comprises first and second abutment portions extending from and orientated at a non-zero angle to the first and second engaging portions respectively, and wherein the first and second abutment portions abut the first backplate radially inner surface and the second backplate radially inner surface, respectively.

7. The brake assembly of claim 1 wherein the first brake pad further comprises a first pad spring mounted on a radially outer portion of the first backplate and the second brake pad comprises a second pad spring mounted on a radially outer portion of the second backplate, wherein the first engaging portion is at least partially interposed between the first pad spring and the first friction material and the second engaging portion is at least partially interposed between the second pad spring and the second friction material.

8. The brake assembly of claim 1 wherein the first backplate face includes a first recess and the second backplate face includes a second recess, and wherein the first engaging portion is at least partially received within the first recess and the second engaging portion is at least partially received within the second recess.

* * * * *